United States Patent
Cites et al.

(10) Patent No.: US 10,144,198 B2
(45) Date of Patent: Dec. 4, 2018

(54) STRENGTHENED GLASS AND COMPOSITIONS THEREFOR

(71) Applicant: CORNING INCORPORATED, Corning, NY (US)

(72) Inventors: Jeffrey Scott Cites, Horseheads, NY (US); Thomas Michael Cleary, Elmira, NY (US); James Gregory Couillard, Ithaca, NY (US); Sinue Gomez, Corning, NY (US); Michael John Moore, Corning, NY (US); Robert Michael Morena, Lindley, NY (US); James Joseph Price, Corning, NY (US); Charles Mitchel Sorensen, Jr., Corning, NY (US); Jonathan Earl Walter, Woodhull, NY (US)

(73) Assignee: CORNING INCORPORATED, Corning, NY (US)

( * ) Notice: Subject to any disclaimer, the term of this patent is extended or adjusted under 35 U.S.C. 154(b) by 344 days.

(21) Appl. No.: 14/699,263

(22) Filed: Apr. 29, 2015

(65) Prior Publication Data
US 2015/0314571 A1    Nov. 5, 2015

Related U.S. Application Data

(60) Provisional application No. 61/987,795, filed on May 2, 2014.

(51) Int. Cl.
*B32B 17/06* (2006.01)
*C03C 4/18* (2006.01)
(Continued)

(52) U.S. Cl.
CPC ........ *B32B 17/06* (2013.01); *B32B 17/10036* (2013.01); *B32B 17/10137* (2013.01);
(Continued)

(58) Field of Classification Search
USPC .......................................................... 428/215
See application file for complete search history.

(56) References Cited

U.S. PATENT DOCUMENTS

| 3,592,726 A | 7/1971 | Blizard |
| 3,630,812 A | 12/1971 | Bruckner |

(Continued)

FOREIGN PATENT DOCUMENTS

| EP | 0757020 B1 | 6/2001 |
| JP | 1999310430 | 11/1999 |

(Continued)

OTHER PUBLICATIONS

Spierings G.A.C.M., Compositional effects in the dissolution of mulitcomponent silicate glasses in aqueous HF solutions, J.Mater. Sci., 1991, vol. 26, No. 12, p. 3329.

(Continued)

*Primary Examiner* — Tahseen Khan
(74) *Attorney, Agent, or Firm* — Brock Riggs

(57) ABSTRACT

A glass laminate structure comprising an external glass sheet and an internal glass sheet wherein one or both of the glass sheets comprises $SiO_2+B_2O_3+Al_2O_3 \geq 86.5$ mol. %. and $R_2O-RO-Al_2O_3 <$ about 5 mol. %. Exemplary glass sheet can comprise between about 69-80 mol. % $SiO_2$, between about 6-12 mol. % $Al_2O_3$, between about 2-10 mol. % $B_2O_3$, between about 0-5 mol. % $ZrO_2$, $Li_2O$, MgO, ZnO and $P_2O_5$, between about 6-15 mol. % $Na_2O$, between about 0-3 mol. % $K_2O$ and CaO, and between about 0-2 mol. % $SnO_2$ to provide a mechanically robust and environmentally durable structure.

18 Claims, 7 Drawing Sheets

(51) Int. Cl.
*B32B 17/10* (2006.01)
*C03C 3/091* (2006.01)
*C03C 3/093* (2006.01)
*C03C 3/097* (2006.01)
*C03C 27/10* (2006.01)

(52) U.S. Cl.
CPC .............. *C03C 3/091* (2013.01); *C03C 3/093* (2013.01); *C03C 3/097* (2013.01); *C03C 4/18* (2013.01); *C03C 27/10* (2013.01); *B32B 2307/102* (2013.01); *B32B 2307/558* (2013.01); *B32B 2307/56* (2013.01); *B32B 2605/006* (2013.01); *C03C 2204/00* (2013.01); *Y10T 428/24967* (2015.01); *Y10T 428/24983* (2015.01); *Y10T 428/315* (2015.01)

(56) References Cited

U.S. PATENT DOCUMENTS

| | | |
|---|---|---|
| 4,009,064 A | 2/1977 | Andrews |
| 4,298,389 A | 11/1981 | Johnson et al. |
| 4,483,700 A | 11/1984 | Forker, Jr. et al. |
| 5,624,763 A | 4/1997 | Melancon et al. |
| 5,674,790 A | 10/1997 | Araujo |
| 5,773,148 A | 6/1998 | Charrue |
| 5,928,793 A | 7/1999 | Kimura |
| 6,133,179 A | 10/2000 | Berthereau |
| 7,341,968 B2 | 3/2008 | Kazushige |
| 7,666,511 B2 | 2/2010 | Ellison et al. |
| 8,007,913 B2 | 8/2011 | Coppola et al. |
| 8,586,492 B2 | 11/2013 | Barefoot et al. |
| 8,969,226 B2 | 3/2015 | Dejneka et al. |
| 2009/0142568 A1 | 6/2009 | Dejneka et al. |
| 2010/0015344 A1 | 1/2010 | Groenewolt |
| 2011/0165393 A1 | 7/2011 | Bayne et al. |
| 2012/0052271 A1 | 3/2012 | Gomez et al. |
| 2012/0094084 A1* | 4/2012 | Fisher ............... B32B 17/10036 428/174 |
| 2013/0015180 A1 | 1/2013 | Godard et al. |
| 2013/0101766 A1 | 4/2013 | Danielson et al. |
| 2013/0312459 A1 | 11/2013 | Coppola et al. |
| 2015/0051060 A1 | 2/2015 | Ellison et al. |
| 2015/0140299 A1 | 5/2015 | Ellison et al. |

FOREIGN PATENT DOCUMENTS

| | | |
|---|---|---|
| WO | 2011114821 A1 | 9/2011 |
| WO | 2014052229 | 4/2014 |
| WO | 14201320 | 12/2014 |
| WO | 2015077109 | 5/2015 |

OTHER PUBLICATIONS

Patent Cooperation Treaty International Notification of Transmittal of the International Search Report and the Written Opinion of the International Searching Authority, international application No. PCT/US2015/028756: dated Aug. 13, 2015, 10 pages.

'Gan Fuxi', Issledovanie Alyumo-Bornoi Anomalii Svoistv Silikatnykh Stekol. Thesis. Leningrad, 1959.

'Marchesini L.' 'Scarinci G.', Vetro e Silicati, 1967, vol. 11, No. 2, p. 5.

'Galant E.I.' 'Appen A.A.', Zh.Prikl.Khim., 1958, vol. 31, No. 11, p. 1741.

English Translation of EP15721989.0 Office Action dated Jul. 23, 2018, European Patent Office, 4 Pgs.

* cited by examiner

STRENGTHENED GLASS AND COMPOSITIONS THEREFOR

This application claims the benefit of priority under 35 U.S.C. § 119 of U.S. Provisional Application Ser. No. 61/987,795 filed on May 2, 2014 the content of which is relied upon and incorporated herein by reference in its entirety.

BACKGROUND

In many vehicular applications, fuel economy is a function of vehicle weight. It is desirable, therefore, to reduce the weight of glazings for such applications without compromising strength and sound-attenuating properties. In this regard, it can be advantageous for a glass laminate to be mechanically robust with respect to external impact events such as attempted forced entry or contact with stones or hail, yet suitably dissipate energy (and fracture) as a result of internal impact events such as contact with an occupant, for example, during a collision. Further, governmental regulations are demanding higher fuel mileage and lower carbon dioxide emissions for road vehicles.

Thus, there has been an increased effort to reduce the weight of these vehicles while maintaining current governmental and industry safety standards. Non-glass window materials, such as polycarbonate, have been developed, which reduce vehicle weight but do not offer appropriate resistance to environmental, debris, and other concerns. Embodiments of the present disclosure, however, provide substantial weight reduction, safety compliance, effective durability and reduced laceration potential in the event of a vehicular crash. In view of the foregoing, thin, light weight glazings that possess the durability and sound-damping properties associated with thicker, heavier glazings are desirable.

There is also a need in other industries for light-weight glazings that are mechanically robust and have superior resistance to certain environmental conditions. Such industries include, but are not limited to, exterior and interior architectural applications and displays, as well as other applications requiring or design glass in an environment subject to environmental and/or mechanical stress.

SUMMARY

According to some embodiments, single or multi-layer laminates or glazings are provided having a glass composition with properties tailored to applications which require mechanical and environmental robustness.

Some embodiments provide a glass laminate structure comprising an external glass sheet and an internal glass sheet where one or both of the glass sheets comprises $SiO_2+B_2O_3+Al_2O_3 \geq 86.5$ mol. %. and $R_2O-RO-Al_2O_3<$about 5 mol. %. In other embodiments, one or both of the glass sheets comprises $SiO_2+B_2O_3+Al_2O_3 \geq$about 88 mol. %. In further embodiments, one or both of the glass sheets comprises $R_2O-RO-Al_2O_3<$about 3 mol. %. Some non-limiting embodiments can include an external glass sheet being a chemically strengthened glass sheet which comprises $SiO_2+B_2O_3+Al_2O_3 \geq 86.5$ mol. %. and $R_2O-RO-Al_2O_3<$about 5 mol. %, and where the internal glass sheet comprises a material selected from the group consisting of soda-lime glass and annealed glass. Other embodiments can include an internal glass sheet being a chemically strengthened glass sheet which comprises $SiO_2+B_2O_3+Al_2O_3 \geq 86.5$ mol. %. and $R_2O-RO-Al_2O_3<$about 5 mol. %, and where the external glass sheet comprises a material selected from the group consisting of soda-lime glass and annealed glass.

Additional embodiments can include a glass sheet comprising $SiO_2+B_2O_3+Al_2O_3 \geq 86.5$ mol. %. and $R_2O-RO-Al_2O_3<$about 5 mol. %. Some embodiments can further comprise $SiO_2+B_2O_3+Al_2O_3 \geq$about 88 mol. % and/or $R_2O-RO-Al_2O_3<$about 3 mol. %. In additional embodiments, the glass sheet further comprises between about 69-80 mol. % $SiO_2$, between about 6-12 mol. % $Al_2O_3$, between about 2-10 mol. % $B_2O_3$, between about 0-5 mol. % $ZrO_2$, $Li_2O$, MgO, ZnO and $P_2O_5$, between about 6-15 mol. % $Na_2O$, between about 0-3 mol. % $K_2O$ and CaO, and between about 0-2 mol. % $SnO_2$. In some embodiments, the glass sheet further comprises between about 72-80 mol. % $SiO_2$, between about 8-12 mol. % $Al_2O_3$, between about 4-10 mol. % $B_2O_3$, between about 0-4 mol. % $ZrO_2$, MgO, and ZnO, between about 0-2 mol. % $Li_2O$, CaO, and $P_2O_5$, between about 7-14 mol. % $Na_2O$, between about 0.1-2.5 mol. % $K_2O$, and between about 0.1-1.5 mol. % $SnO_2$. In yet further embodiments, the glass sheet further comprises between about 74-80 mol. % $SiO_2$, between about 8-11 mol. % $Al_2O_3$, between about 4-9 mol. % $B_2O_3$, between about 0-2 mol. % $ZrO_2$, between about 0-3 mol. % MgO and ZnO, between about 0-1 mol. % $Li_2O$ and $P_2O_5$, between about 7-12 mol. % $Na_2O$, between about 0.1-2.2 mol. % $K_2O$, between about 0-1.5 mol. % CaO, and between about 0.1-0.5 mol. % $SnO_2$.

Additional features and advantages of the claimed subject matter will be set forth in the detailed description which follows, and in part will be readily apparent to those skilled in the art from that description or recognized by practicing the claimed subject matter as described herein, including the detailed description which follows, the claims, as well as the appended drawings.

It is to be understood that both the foregoing general description and the following detailed description present embodiments of the present disclosure, and are intended to provide an overview or framework for understanding the nature and character of the claimed subject matter. The accompanying drawings are included to provide a further understanding of the present disclosure, and are incorporated into and constitute a part of this specification. The drawings illustrate various embodiments and together with the description serve to explain the principles and operations of the claimed subject matter.

BRIEF DESCRIPTION OF THE DRAWINGS

For the purposes of illustration, there are forms shown in the drawings that are presently preferred, it being understood, however, that the embodiments disclosed and discussed herein are not limited to the precise arrangements and instrumentalities shown.

DETAILED DESCRIPTION

Figure 1:
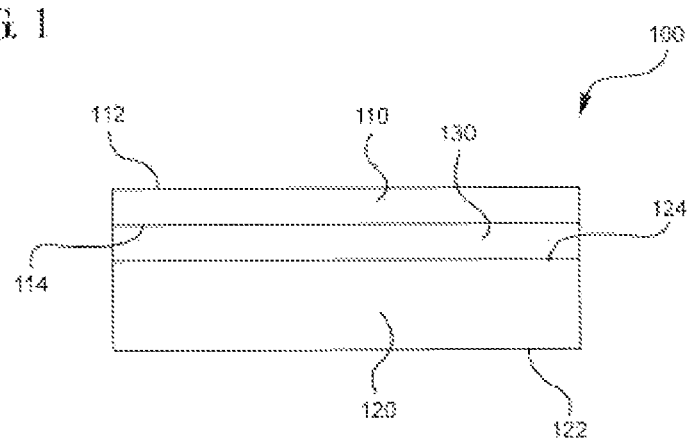
FIG. 1 is a schematic of an exemplary planar glass laminate structure according to some embodiments of the present disclosure.

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise, consist essentially of, or consist of any number of those elements recited, either individually or in combination with each other.

Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range. As used herein, the indefinite articles "a," and "an," and the corresponding definite article "the" mean "at least one" or "one or more," unless otherwise specified.

The following description of the present disclosure is provided as an enabling teaching thereof and its best, currently-known embodiment. Those skilled in the art will recognize that many changes can be made to the embodiment described herein while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations of the present disclosure are possible and may even be desirable in certain circumstances and are part of the present disclosure. Thus, the following description is provided as illustrative of the principles of the present disclosure and not in limitation thereof.

Those skilled in the art will appreciate that many modifications to the exemplary embodiments described herein are possible without departing from the spirit and scope of the present disclosure. Thus, the description is not intended and should not be construed to be limited to the examples given but should be granted the full breadth of protection afforded by the appended claims and equivalents thereto. In addition, it is possible to use some of the features of the present disclosure without the corresponding use of other features. Accordingly, the following description of exemplary or illustrative embodiments is provided for the purpose of illustrating the principles of the present disclosure and not in limitation thereof and may include modification thereto and permutations thereof.

The glass laminate structures disclosed herein can be configured to include an external chemically-strengthened glass sheet and an internal non-chemically-strengthened glass sheet in some embodiments. In other embodiments, the glass laminate structures can be configured to include an internal chemically-strengthened glass sheet and an external non-chemically-strengthened glass sheet. In yet further embodiments, the glass laminate structures can be configured to include external and internal chemically-strengthened glass sheets. As defined herein, when the glass laminate structures are put into use, an external glass sheet will be proximate to or in contact the environment, while an internal glass sheet will be proximate to or in contact with the interior (e.g., cabin) of the structure (e.g., building, etc.) or vehicle (e.g., automobile) incorporating the glass laminate. Of course, the claims appended herewith should not be so limited as embodiments can include single sheets of glass or glass-glass laminate structures without intermediate polymer interlayers.

Glass Laminate Structures

An exemplary, non-limiting glass laminate structure is illustrated in FIG. 1. The glass laminate structure 100 comprises an external glass sheet 110, an internal glass sheet 120, and a polymer interlayer 130. The polymer interlayer can be in direct physical contact (e.g., laminated to) each of the respective external and internal glass sheets. The external glass sheet 110 has an exterior surface 112 and an interior surface 114. In a similar vein, the internal glass sheet 120 has an exterior surface 122 and an interior surface 124. As shown in the illustrated embodiment, the interior surface 114 of external glass sheet 110 and the interior surface 124 of internal glass sheet 120 are each in contact with polymer interlayer 130. In glass-lass laminate structures, the laminate structure 100 will not include a polymer interlayer.

During use, it is desirable that glass laminate structures resist fracture in response to external impact events. In response to internal impact events, however, such as the glass laminate structures being struck by a vehicle's occupant, it is desirable that the glass laminate structure retain the occupant in the vehicle yet dissipate energy upon impact in order to minimize injury. The ECE R43 headform test, which simulates impact events occurring from inside a vehicle, is a regulatory test that requires that laminated glazings fracture in response to specified internal imp act.

Without wishing to be bound by theory, when one pane of a glass sheet/polymer interlayer/glass sheet laminate is impacted, the opposite surface of the impacted sheet, as well as the exterior surface of the opposing sheet are placed into tension. Calculated stress distributions for a glass sheet/polymer interlayer/glass sheet laminate under biaxial loading reveal that the magnitude of tensile stress in the opposite surface of the impacted sheet may be comparable to (or even slightly greater than) the magnitude of the tensile stress experienced at the exterior surface of the opposing sheet for low loading rates. However, for high loading rates, which are characteristic of impacts typically experienced in automobiles, the magnitude of the tensile stress at the exterior surface of the opposing sheet may be much greater than the tensile stress at the opposite surface of the impacted sheet. As disclosed herein, by configuring the hybrid glass laminate structures to have a chemically-strengthened external glass sheet and a non-chemically-strengthened internal glass sheet, the impact resistance for both external and internal impact events can be optimized.

Suitable internal glass sheets in some embodiments can be non-chemically-strengthened glass sheets such as soda-lime glass. Optionally, the internal glass sheets may be heat strengthened. In embodiments where soda-lime glass is used as the non-chemically-strengthened glass sheet, conventional decorating materials and methods (e.g., glass frit enamels and screen printing) can be used, which can simplify the glass laminate structure manufacturing process. Tinted soda-lime glass sheets can be incorporated into a hybrid glass laminate structure to achieve desired transmission and/or attenuation across the electromagnetic spectrum.

Suitable external (or internal) glass sheets may be chemically strengthened by an ion exchange process. In this process, typically by immersion of the glass sheet into a molten salt bath for a predetermined period of time, ions at or near the surface of the glass sheet are exchanged for larger metal ions from the salt bath. In one embodiment, the temperature of the molten salt bath is about 410° C. to about 480° C. and the predetermined time period can be between two to about eight hours. The incorporation of the larger ions into the glass strengthens the sheet by creating a compressive stress in a near surface region. A corresponding tensile stress is induced within a central region of the glass to balance the compressive stress.

As noted above, glass sheets can be used to form glass laminate structures. As defined herein, a hybrid glass laminate structure comprises in some embodiments an externally-facing chemically-strengthened glass sheet, an internally-facing non-chemically-strengthened glass sheet, and a polymer interlayer formed between the glass sheets. In other embodiments, a hybrid glass laminate structure comprises an internally-facing chemically-strengthened glass sheet, an externally-facing non-chemically-strengthened glass sheet, and a polymer interlayer formed between the glass sheets. In yet further embodiments, a glass laminate structure can comprise two chemically-strengthened glass sheets with an intermediate polymer interlayer or can include glass-glass laminate structures without an intermediate polymer interlayer. The polymer interlayer can comprise a monolithic polymer sheet, a multilayer polymer sheet, or a composite polymer sheet. The polymer interlayer can be, for example, a plasticized poly(vinyl butyral) sheet.

each of the glass sheets to the polymer interlayer. In the foregoing embodiment, the first sheet can be a chemically-strengthened glass sheet and the second sheet can be a non-chemically-strengthened glass sheet or vice versa.

A thermoplastic material such as PVB may be applied as a preformed polymer interlayer. The thermoplastic layer can, in certain embodiments, have a thickness of at least 0.125 mm (e.g., 0.125, 0.25, 0.38, 0.5, 0.7, 0.76, 0.81, 1, 1.14, 1.19 or 1.2 mm). The thermoplastic layer can have a thickness of less than or equal to 1.6 mm (e.g., from 0.4 to 1.2 mm, such as about 0.4, 0.5, 0.6, 0.7, 0.8, 0.9, 1.0, 1.1 or 1.2 mm). The thermoplastic layer can cover most or, preferably, substantially all of the two opposed major faces of the glass. It may also cover the edge faces of the glass. The glass sheets in contact with the thermoplastic layer may be heated above the softening point of the thermoplastic, such as, for example, at least 5° C. or 10° C. above the softening point, to promote bonding of the thermoplastic material to the respective glass sheets. The heating can be performed with the glass in contact with the thermoplastic layers under pressure.

Select commercially available polymer interlayer materials are summarized in Table 1, which provides also the glass transition temperature and modulus for each product sample. Glass transition temperature and modulus data were determined from technical data sheets available from the vendor or using a DSC 200 Differential Scanning Calorimeter (Seiko Instruments Corp., Japan) or by ASTM D638 method for the glass transition and modulus data, respectively. A further description of the acrylic/silicone resin materials used in the ISD resin is disclosed in U.S. Pat. No. 5,624,763, and a description of the acoustic modified PVB resin is disclosed in Japanese Patent No. 05138840, the entirety of which are hereby incorporated by reference.

TABLE 1

Exemplary Polymer Interlayer Materials

| Interlayer Material | $T_g$ (° C.) | Modulus, psi (MPa) |
| --- | --- | --- |
| EVA (STR Corp., Enfield, CT) | −20 | 750-900 (5.2-6.2) |
| EMA (Exxon Chemical Co., Baytown, TX) | −55 | <4,500 (27.6) |
| EMAC (Chevron Corp., Orange, TX) | −57 | <5,000 (34.5) |
| PVC plasticized (Geon Company, Avon Lake, OH) | −45 | <1500 (10.3) |
| PVB plasticized (Solutia, St. Louis, MO) | 0 | <5000 (34.5) |
| Polyethylene, Metallocene-catalyzed (Exxon Chemical Co., Baytown, TX) | −60 | <11,000 (75.9) |
| Polyurethane Hard (97 Shore A) | 31 | 400 |
| Polyurethane Semi-rigid (78 Shore A) | −49 | 54 |
| ISD resin (3M Corp., Minneapolis, MN) | −20 | |
| Acoustic modified PVB (Sekisui KKK, Osaka, Japan) | | 140 |
| Uvekol A (liquid curable resins) (Cytec, Woodland Park, NJ) | | |

Glass laminate structures can be adapted to provide an optically transparent barrier in architectural and automotive openings, e.g., automotive glazings. Glass laminate structures can be formed using a variety of processes. The assembly, in an exemplary embodiment, involves laying down a first sheet of glass, overlaying a polymer interlayer such as a PVB sheet, laying down a second sheet of glass, and then trimming the excess PVB to the edges of the glass sheets. A tacking step can include expelling most of the air from the interfaces and partially bonding the PVB to the glass sheets. The finishing step, typically carried out at elevated temperature and pressure, completes the mating of One or more polymer interlayers may be incorporated into a glass laminate structure (hybrid or otherwise). A plurality of interlayers may provide complimentary or distinct functionality, including adhesion promotion, acoustic control, UV transmission control, tinting, coloration and/or IR transmission control.

A modulus of elasticity of the polymer interlayer can range from about 1 MPa to 75 MPa (e.g., about 1, 2, 5, 10, 15, 20, 25, 50 or 75 MPa). At a loading rate of 1 Hz, a modulus of elasticity of a standard PVB interlayer can be about 15 MPa, and a modulus of elasticity of an acoustic grade PVB interlayer can be about 2 MPa.

A total thickness of the glass laminate structure can range from about 1.0 mm to 5 mm, with the external and/or internal chemically-strengthened glass sheets having a thickness of 1.4 mm or less (e.g., from 0.5 to 1.4 mm such as, for example, 0.5, 0.6, 0.7, 0.8, 0.9, 1, 1.1, 1.2, 1.3, or 1.4 mm). Further, the internal and/or external non-chemically-strengthened glass sheets can have a thickness of 2.5 mm or less (e.g., from 1 to 2 mm such as, for example, 1, 1.5, 2 or 2.5 mm) or may have a thickness of 2.5 mm or more. In embodiments, the total thickness of the glass sheets in the glass laminate structure can be less than 3.5 mm (e.g., less than 3.5, 3, 2.5 or 2.3 mm).

During an exemplary lamination process, an interlayer is typically heated to a temperature effective to soften the interlayer, which promotes a conformal mating of the interlayer to respective surfaces of the glass sheets. For PVB, a lamination temperature can be about 140° C. Mobile polymer chains within the interlayer material develop bonds with the glass surfaces, which promote adhesion. Elevated temperatures also accelerate the diffusion of residual air and/or moisture from the glass-polymer interface.

The application of pressure both promotes flow of the interlayer material, and suppresses bubble formation that otherwise could be induced by the combined vapor pressure of water and air trapped at the interfaces. To suppress bubble formation, heat and pressure are simultaneously applied to the assembly in an autoclave.

Glass laminate structures according to some embodiments described herein can provide beneficial effects, including the attenuation of acoustic noise, reduction of UV and/or IR light transmission, and/or enhancement of the aesthetic appeal of a window opening. The individual glass sheets comprising the disclosed glass laminate structures, as well as the formed laminates, can be characterized by one or more attributes, including composition, density, thickness, surface metrology, as well as various properties including optical, sound-attenuation, and mechanical properties such as impact resistance. Exemplary hybrid glass laminate structures can be adapted for use, for example, as windows or glazings, and configured to any suitable size and dimension. In embodiments, the glass laminate structures have a length and width that independently vary from 10 cm to 1 m or more (e.g., 0.1, 0.2, 0.5, 1, 2, or 5 m). Independently, the glass laminate structures can have an area of greater than 0.1 $m^2$, e.g., greater than 0.1, 0.2, 0.5, 1, 2, 5, 10, or 25 $m^2$.

The glass laminate structures can be substantially flat or shaped for certain applications. For instance, the glass laminate structures can be formed as bent or shaped parts for use as windshields and other automotive glass structures (interior or exterior), displays (interior or exterior), architectural windows, cover plates, or the like. The structure of a shaped glass laminate structure may be simple or complex. In certain embodiments, a shaped glass laminate structure may have a complex curvature where the glass sheets have a distinct radius of curvature in two independent directions. Such shaped glass sheets may thus be characterized as having "cross curvature," where the glass is curved along an axis that is parallel to a given dimension and also curved along an axis that is perpendicular to the same dimension. An automobile sunroof, as a non-limiting example, typically measures about 0.5 m by 1.0 m and has a radius of curvature of 2 to 2.5 m along the minor axis, and a radius of curvature of 4 to 5 m along the major axis.

Shaped glass laminate structures according to certain embodiments can be defined by a bend factor, where the bend factor for a given part is equal to the radius of curvature along a given axis divided by the length of that axis. Thus, for a non-limiting exemplary automotive sunroof having radii of curvature of 2 m and 4 m along respective axes of 0.5 m and 1.0 m, the bend factor along each axis is 4. Shaped glass laminate structures can have a bend factor ranging from 2 to 8 (e.g., 2, 3, 4, 5, 6, 7, or 8).

Figure 2:
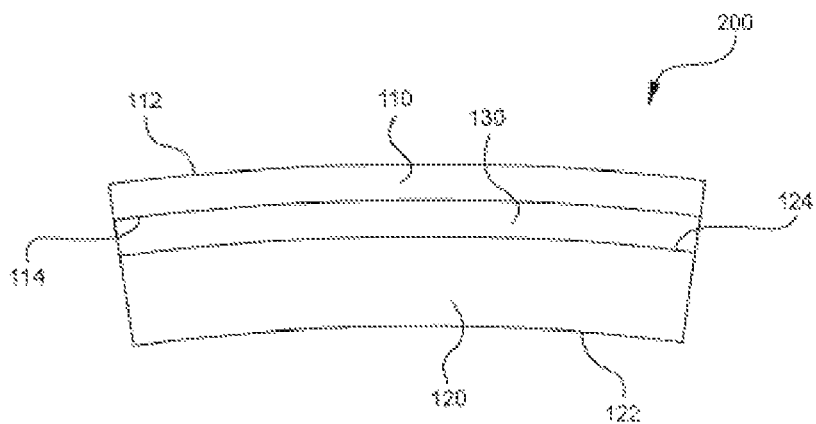
FIG. 2 is a schematic of an exemplary glass laminate structure according to other embodiments of the present disclosure.

An exemplary shaped glass laminate structure 200 is illustrated in FIG. 2. The shaped laminate 200 comprises an external (chemically-strengthened) glass sheet 110 formed at a convex surface of the laminate while an internal (non-chemically-strengthened) glass sheet 120 is formed on a concave surface of the laminate. It will be appreciated, however, that the convex surface of a non-illustrated embodiment can comprise a non-chemically-strengthened glass sheet while an opposing concave surface can comprise a chemically-strengthened glass sheet.

Figure 3:
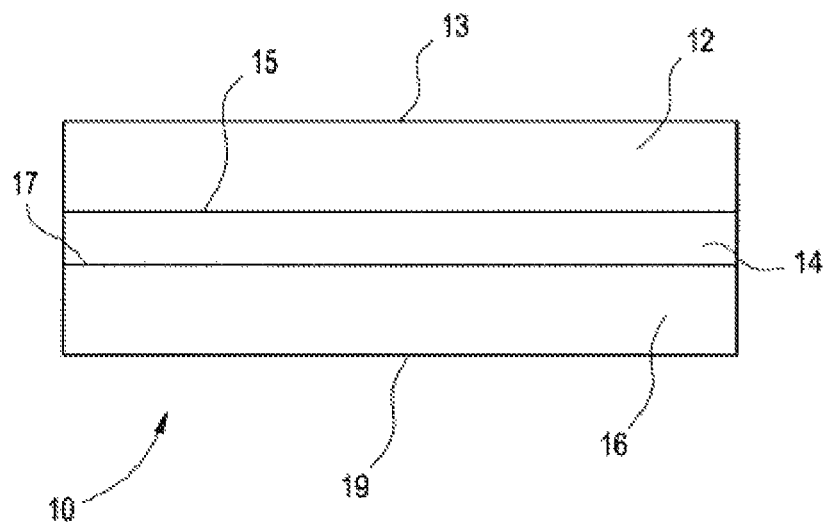
FIG. 3 is a schematic of an exemplary bent glass laminate structure according to further embodiments of the present disclosure.
Figure 4:
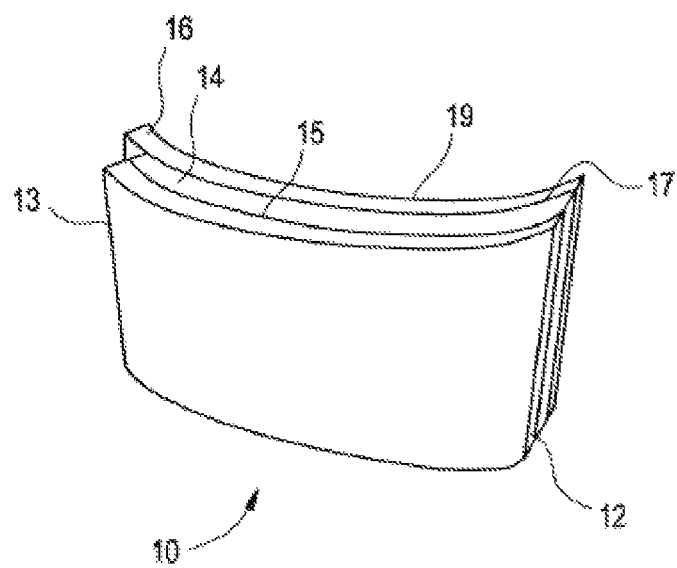
FIG. 4 is a schematic of an exemplary bent glass laminate structure according to additional embodiments of the present disclosure.

FIG. 3 is a cross sectional illustration of further embodiments of the present disclosure. FIG. 4 is a perspective view of additional embodiments of the present disclosure. With reference to FIGS. 3 and 4 and as discussed in previous paragraphs, an exemplary laminate structure 10 can include an inner layer 16 of chemically strengthened glass. This inner layer 16 may have been heat treated, ion exchanged and/or annealed. The outer layer 12 may be a non-chemically strengthened glass sheet such as conventional soda lime glass, annealed glass, or the like. The laminate 10 can also include a polymeric interlayer 14 intermediate the outer and inner glass layers. The inner layer of glass 16 can have a thickness of less than or equal to 1.0 mm and have a residual surface CS level of between about 250 MPa to about 900 MPa with a DOL of between 20 microns to 60 microns or greater. In one embodiment, an interlayer 14 can have a thickness of approximately 0.8 mm. Exemplary interlayers 14 can include, but are not limited to, poly-vinyl-butyral or other suitable polymeric materials as described herein. In additional embodiments, any of the surfaces of the outer and/or inner layers 12, 16 can be acid etched to improve durability to external impact events. For example, in one embodiment, a first surface 13 of the outer layer 12 can be acid etched and/or another surface 17 of the inner layer can be acid etched. In another embodiment, a first surface 15 of the outer layer can be acid etched and/or another surface 19 of the inner layer can be acid etched. Such embodiments can thus provide a laminate construction substantially lighter than conventional laminate structures and which conforms to regulatory impact requirements. Exemplary thicknesses of the outer and/or inner layers 12, 16 can range in thicknesses from 0.5 mm to 1.5 mm to 2.0 mm or more. Of course, the claims appended herewith should not be so limited as embodiments can include single sheets of glass or glass-glass laminate structures without polymeric interlayers.

In a preferred embodiment, the thin chemically strengthened inner layer 16 may have a surface stress between about 250 MPa and 900 MPa and can range in thickness from 0.4 to 1.5 mm. In this embodiment, the external layer 12 can be annealed (non-chemically strengthened) glass with a thickness from about 1.5 mm to about 3.0 mm or more. Of course, the thicknesses of the outer and inner layers 12, 16 can be different in a respective laminate structure 10. Another preferred embodiment of an exemplary laminate structure may include an inner layer of 0.7 mm chemically strengthened glass, a poly-vinyl butyral layer of about 0.76 mm in thickness and a 2.1 mm exterior layer of annealed glass.

Glass Compositions

Non-limiting exemplary ion-exchangeable glasses that are suitable for forming hybrid glass laminate structures are alkali aluminosilicate glasses or alkali aluminoborosilicate glasses, though other glass compositions are contemplated. As used herein, "ion exchangeable" means that a glass is capable of exchanging cations located at or near the surface of the glass with cations of the same valence that are either larger or smaller in size. Some exemplary glass compositions comprise $SiO_2$, $B_2O_3$ and $Na_2O$, where $(SiO_2+B_2O_3) \geq 75$ mol. %, and $Na_2O \geq 9$ mol. %. In other embodiments, the glass sheets can include at least 7 mol. % aluminum oxide $Al_2O_3$. In some embodiments, $SiO_2+B_2O_3+Al_2O_3 \geq 86.5$ mol. %. In other embodiments, suitable glass compositions can include alkali and alkaline earth modifiers (e.g., $R_2O$, RO) where $R_2O—RO—Al_2O_3 <$about 5 mol. %. In yet further embodiments, $SiO_2+B_2O_3+Al_2O_3 \geq 86.5$ mol. %. and $R_2O—RO—Al_2O_3 <$about 5 mol. %. In additional embodiments, $SiO_2+B_2O_3+Al_2O_3 >$about 88 mol. % and/or $R_2O—RO—Al_2O_3 <$ about 3 mol. %. Suitable glass compositions, in some embodiments, further comprise at least one of $K_2O$, MgO, $Li_2O$, ZnO, $ZrO_2$, $Fe_2O_3$, $SnO_2$, CaO and combinations thereof.

A further exemplary glass composition suitable for forming glass or glass laminate structures comprises no less than about 70-80 mol. % $SiO_2$, between about 69-75 mol. % $SiO_2$, between about 70-80 mol. % $SiO_2$, between about 72-80 mol. % $SiO_2$, between about 74-80 mol. % $SiO_2$, or between about 76-80 mol. % $SiO_2$. Glass compositions can also comprise between about 6-12 mol. % $Al_2O_3$, between about 8-12 mol. % $Al_2O_3$, or between about 8-11 mol. % $Al_2O_3$. Some glass compositions can comprise between about 2-10 mol. % $B_2O_3$, between about 4-10 mol. % $B_2O_3$, or between about 4-9 mol. % $B_2O_3$. Additional glass compositions can comprise between about 0-5 mol. % $ZrO_2$, between about 0-4 mol. % $ZrO_2$, or between about 0-2 mol. % $ZrO_2$. Further glass compositions can comprise between about 0-5 mol. % $P_2O_5$, between about 0-2 mol. % $P_2O_5$, or between about 0-1 mol. % $P_2O_5$. Some glass compositions can comprise between about 0-5 mol. % $Li_2O$, between about 0-2 mol. % $Li_2O$, or between about 0-1 mol. % $Li_2O$. Further glass compositions can comprise between about 6-15 mol. % $Na_2O$, between about 7-14 mol. % $Na_2O$, or between about 7-12 mol. % $Na_2O$. Additional glass compositions can comprise between about 0-3 mol. % $K_2O$, between about 0.1-2.5 mol. % $K_2O$, or between about 0.1-2.2 mol. % $K_2O$. Some glass compositions can comprise between about 0-5 mol. % MgO and/or ZnO, between about 0-4 mol. % MgO and/or ZnO, or between about 0-3 mol. % MgO and/or ZnO. Additional glass compositions can comprise between about 0-3 mol. % CaO, between about 0-2 mol. % CaO, or between about 0-1.5 mol. % CaO. Some glass compositions can comprise between about 0-2 mol. % $SnO_2$, between about 0.1-1.5 mol. % $SnO_2$, or between about 0.1-0.5 mol. % $SnO_2$. Embodiments can also include other modifiers such as, but not limited to $Fe_2O_3$, etc.

Some exemplary glass compositions suitable for forming glass or glass laminate structures can comprise $R_2O—RO—Al_2O_3$ between about 0.5-6.0 mol. %, $R_2O—RO—Al_2O_3$ between about 0-5.0 mol. %, or $R_2O—RO—Al_2O_3$ less than about 5 mol. % or less than about 3 mol. %. Other exemplary glass compositions suitable for forming glass or glass laminate structures can comprise $SiO_2+B_2O_3+Al_2O_3$ between about 84-92 mol. %, $SiO_2+B_2O_3+Al_2O_3$ between about 85-91 mol. %, or $SiO_2+B_2O_3+Al_2O_3$ greater than or equal to about 86.5 mol. % or greater than or equal to about 88 mol. %. Some exemplary glass compositions suitable for forming glass or glass laminate structures can comprise $(R_2O+RO)/(P_2O_5+B_2O_3+Al_2O_3)$ between about 0.5-1.2, between about 0.6-0.9, or between about 0.65-0.85. Other exemplary glass compositions suitable for forming glass or glass laminate structures can comprise $SiO_2+B_2O_3+Al_2O_3 >$about 86.5 mol. %. or $SiO_2+B_2O_3+Al_2O_3 \geq$about 88 mol. %. Additional glass compositions can comprise $R_2O—RO—Al_2O_3 <$about 5 mol. % or $R_2O—RO—Al_2O_3 <$about 3 mol. %. Further glass compositions can comprise $SiO_2+B_2O_3+Al_2O_3 \geq$about 86.5 mol. %. and $R_2O—RO—Al_2O_3 <$about 5 mol. % or $R_2O—RO—Al_2O_3 <$about 3 mol. %. Some glass compositions can comprise $SiO_2+B_2O_3+Al_2O_3 \geq$about 88 mol. %. and $R_2O—RO—Al_2O_3 <$about 5 mol. % or $R_2O—RO—Al_2O_3 <$about 3 mol. %. Some exemplary embodiments can be ion-exchanged to a compressive stress of at least 300 MPa and a DOL of at least 15 microns with a KST> about 12N and an H/E>about 0.112. Further exemplary embodiments, can be ion-exchanged to a CS of at least 300 MPa and a DOL of at least 15 microns with a KST> about 16N and an H/E>about 0.116.

In some embodiments, suitable glass sheets can comprises between about 69-80 mol. % $SiO_2$, between about 6-12 mol. % $Al_2O_3$, between about 2-10 mol. % $B_2O_3$, between about 0-5 mol. % $ZrO_2$, $Li_2O$, MgO, ZnO and $P_2O_5$, between about 6-15 mol. % $Na_2O$, between about 0-3 mol. % $K_2O$ and CaO, and between about 0-2 mol. % $SnO_2$. In other embodiments, the glass sheet further comprises between about 72-80 mol. % $SiO_2$, between about 8-12 mol. % $Al_2O_3$, between about 4-10 mol. % $B_2O_3$, between about 0-4 mol. % $ZrO_2$, MgO, and ZnO, between about 0-2 mol. % $Li_2O$, CaO, and $P_2O_5$, between about 7-14 mol. % $Na_2O$, between about 0.1-2.5 mol. % $K_2O$, and between about 0.1-1.5 mol. % $SnO_2$. In yet further embodiments, the glass sheet further comprises between about 74-80 mol. % $SiO_2$, between about 8-11 mol. % $Al_2O_3$, between about 4-9 mol. % $B_2O_3$, between about 0-2 mol. % $ZrO_2$, between about 0-3 mol. % MgO and ZnO, between about 0-1 mol. % $Li_2O$ and $P_2O_5$, between about 7-12 mol. % $Na_2O$, between about 0.1-2.2 mol. % $K_2O$, between about 0-1.5 mol. % CaO, and between about 0.1-0.5 mol. % $SnO_2$. In some embodiments, $(R_2O+RO)/(P_2O_5+B_2O_3+Al_2O_3)$ can be between about 0.5-1.2, between about 0.6-0.9, or between about 0.65-0.85.

Additional exemplary and preferable glass compositions can be designed to have a high transparency (>75%) over the visible range (approximately 400 nm to approximately 800 nm) and have a viscosity of <about $10^{9.9}$ Poise at 725° C. to enable the glass sheet to be sag formed using conventional equipment. Table 2 provides exemplary elementary compositions and data for some glass materials.

TABLE 2

| (Mol %) | Comp 1 | Comp 2 | Comp 3 | Comp 4 |
|---|---|---|---|---|
| $SiO_2$ | 73 | 72 | 70.1 | 72.19 |
| $Al_2O_3$ | 9.2 | 9.3 | 10 | 9.22 |
| $B_2O_3$ | 7.1 | 7.4 | 8.4 | 7.98 |
| $P_2O_5$ | 0 | 0 | 0 | 0 |
| $Li_2O$ | 0.5 | 0.5 | 0 | 0 |
| $Na_2O$ | 9.7 | 10.3 | 9.2 | 8.35 |
| $K_2O$ | 0.5 | 0.5 | 2.3 | 2.04 |
| MgO | | | | |
| CaO | | | | |
| ZnO | | | | |
| $ZrO_2$ | | | | |
| $Fe_2O_3$ | | | | |
| $SnO_2$ | 0.1 | 0.1 | 0.1 | 0.16 |
| $R_2O/Al_2O_3$ | 1.16 | 1.22 | 1.15 | 1.1 |
| Strain | 532 | 528 | 530 | 532 |
| Anneal | 583 | 577 | 580 | 586 |
| Softening Pt. | 838 | 818 | 843 | 848 |
| $10^{9.9}$ P temp | 696 | 683 | 684 | 700 |
| DOL (480-2 hr) | 37 | 35 | 44 | 42 |
| DOL (480-3 hr) | 46 | 44 | | |

TABLE 2-continued

| (Mol %) | Comp 1 | Comp 2 | Comp 3 | Comp 4 |
|---|---|---|---|---|
| 5% HCl | n.d. | 0.01 | n.d. | 0.02 |
| 1M HNO$_3$ | 0.05 | 0.06 | 0.22 | 0.07 |
| 0.02N H$_2$SO$_4$ | 0.02 | 0.03 | 0.08 | 0.05 |
| Int. Threshold (480-2 hr) | 5-6 kg | 6-7 kg | 6-7 kg | |
| Knoop Threshold (480-3 hr) | >40N | 18-20N | 16-18N | |

Figure 5:
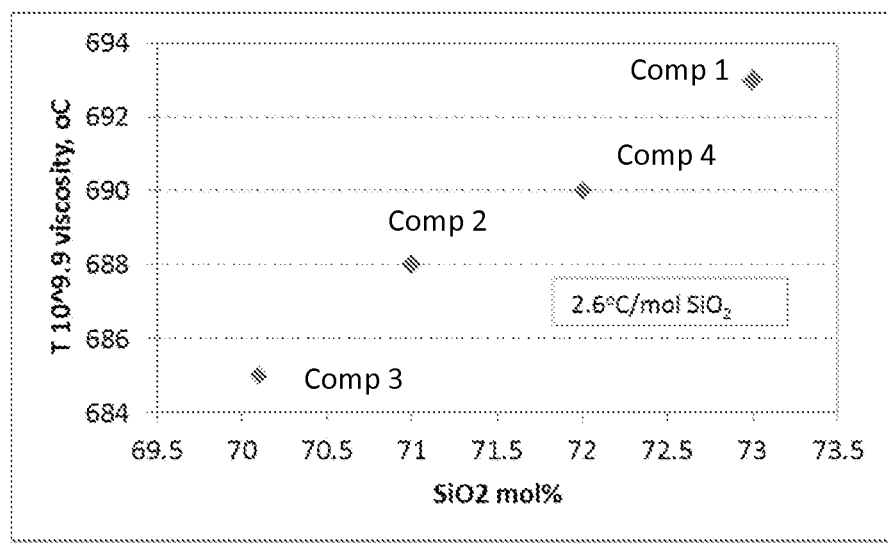
FIG. 5 is a plot showing the effect of glass composition on bending temperature of some exemplary compositions.

FIG. 5 is a plot showing the effect of glass composition on bending temperature for the exemplary compositions listed above in Table 2. With reference to FIG. 5, the largest single constituent of exemplary glass compositions can be observed as SiO$_2$, which forms the matrix of the glass and can be present in concentrations >70 mol %. In such embodiments, SiO$_2$ can serve as a viscosity enhancer to aid formability and impart chemical durability to the glass. It has been discovered that glass durability can suffer at SiO$_2$ concentrations below 70 mol % or below 69 mol. %. In addition, SiO$_2$ concentrations that are less than the ranges described herein can cause the liquidus temperature to increase substantially in glasses having high alkali or alkali earth metal oxide concentrations and therefore can prevent producing glass by down-draw processes. Nevertheless, SiO$_2$ raises the melting temperature significantly; however, the alkali metal oxides content of the exemplary glass compositions can facilitate melting, soften the glass, enable ion exchange, decrease melt resistivity, and can break up the glass network which increases thermal expansion and decreases durability.

Alkaline earth oxides (also referred to herein as "alkali earth metal oxides") can also create a steeper viscosity curve for the glasses. Replacing alkali metal oxides with alkaline earth metal oxides can generally increase annealing and strain points of the glass while lowering the melting temperatures necessary to make high quality glass. In some exemplary embodiments, B$_2$O$_3$ can be used as a flux to soften glasses, making them easier to melt and easier to form. B$_2$O$_3$ can also be used to scavenge non-bridging oxygen atoms (NBOs) to thereby convert the NBOs to bridging oxygen atoms through the formation of a BO$_4$ tetrahedra, which increases the toughness of the glass by minimizing the number of weak NBOs. B$_2$O$_3$ can also lower the hardness of the glass which, when coupled with the higher toughness, decreases the brittleness, thereby resulting in a mechanically durable glass.

As shown in Table 2, exemplary compositions were able to accept point contact loads, such as from a Vickers indenter, of 5 N or greater without fracture and were able to retain 80% or more of its initial strength, as determined by ring-on-ring testing, after receiving representative scratches of up to 7 N and up to 10 N from a Knoop indenter. Exemplary embodiments can also be ion exchanged efficiently to retain improved mechanical performance after typical damage exposure. In some embodiments, the magnitude of compressive stress can be >550 MPa with a DOL>40 μm after less than two hours in an ion exchange bath at 480° C. or cooler for reduced manufacturing cost.

Figure 6:
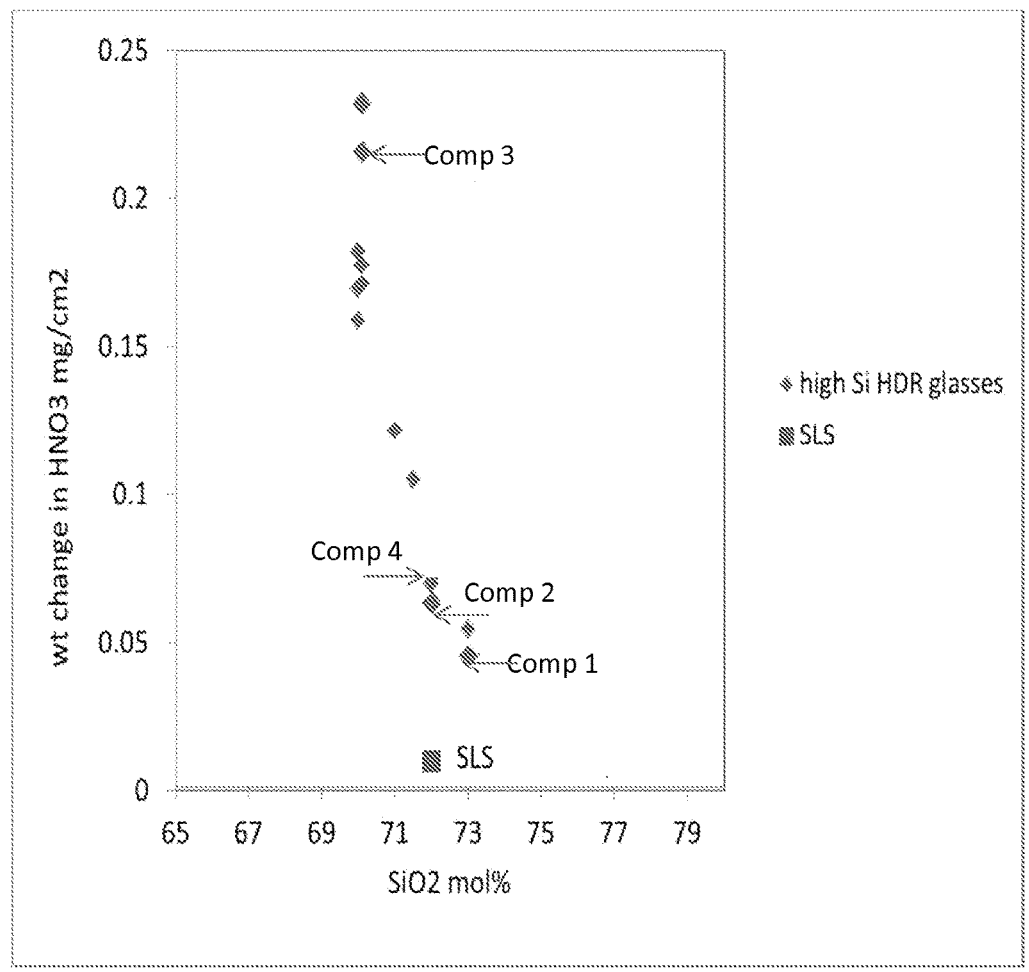
FIG. 6 is a plot showing the effect of exemplary glass compositions with regard to acid durability.

With the compositions described herein, glass sheets can also resist chemical exposure, particularly to acid or other deleterious environmental effects. FIG. 6 is a plot showing the effect of glass compositions within the ranges described herein on acid durability. It was discovered that exemplary compositions resisted degradation under simulated acid rain exposure, such as that described in ASTM D7356. It was also discovered that the described glass compositions can block UV transmission below 320 nm to prevent yellowing of polymer interlayers used in laminate window structures and prevented bleaching of plastic or other materials on an interior side of the glass pane or laminate window structure.

Table 3 provides additional exemplary elementary compositions and data for further glass materials.

TABLE 3

| | 1 | 2 | 3 | 4 | 5 | 6 | 7 |
|---|---|---|---|---|---|---|---|
| SiO$_2$ | 73.7 | 72.5 | 71.8 | 71.8 | 70.6 | 71.8 | 71.8 |
| Al$_2$O$_3$ | 8.0 | 8.8 | 9.2 | 9.7 | 10 | 9.2 | 9.7 |
| B$_2$O$_3$ | 4.1 | 5.7 | 6.5 | 6.5 | 8.1 | 6.5 | 6.5 |
| ZrO$_2$ | 0.0 | 0.0 | 0.0 | 0.0 | 0.0 | 0.0 | 0.0 |
| P$_2$O$_5$ | 0.0 | 0.0 | 0.0 | 0.0 | 0.0 | 0.0 | 0.0 |
| Li$_2$O | 0.0 | 0.0 | 0.0 | 0.0 | 0.0 | 0.0 | 0.0 |
| Na$_2$O | 10.3 | 9.8 | 9.5 | 9.0 | 9.0 | 9.5 | 9.0 |
| K$_2$O | 1.1 | 1.5 | 1.7 | 1.7 | 2.1 | 1.7 | 1.7 |
| MgO | 2.4 | 1.4 | 1.0 | 1.0 | 0.0 | 0.0 | 0.0 |
| ZnO | 0.0 | 0.0 | 0.0 | 0.0 | 0.0 | 1.0 | 1.0 |
| CaO | 0.3 | 0.2 | 0.1 | 0.1 | 0.0 | 0.1 | 0.1 |
| SnO$_2$ | 0.2 | 0.2 | 0.2 | 0.2 | 0.2 | 0.2 | 0.2 |
| R$_2$O—RO—Al$_2$O$_3$ | 6.1 | 4.1 | 3.1 | 2.1 | 1.1 | 3.1 | 2.1 |
| SiO$_2$ + B$_2$O$_3$+ Al$_2$O$_3$ | 85.8 | 86.9 | 87.5 | 88.0 | 88.7 | 87.5 | 88.0 |
| R$_2$O + RO/Al$_2$O$_3$+ B$_2$O$_3$+ P$_2$O$_5$ | 1.17 | 0.89 | 0.78 | 0.73 | 0.61 | 0.78 | 0.73 |
| strain | 552 | 542 | 539 | 542 | 525 | 533 | 536 |
| anneal | 600 | 591 | 589 | 595 | 577 | 582 | 591 |
| Softening | 852 | 842 | 843 | 880 | 845 | 834 | 880 |
| CTE | 67.5 | 67.0 | 67.3 | 66.5 | 69.7 | 66.1 | 68 |
| Density | 2.384 | 2.371 | 2.361 | 2.352 | 2.342 | 2.375 | 2.36 |
| Ion-exchange temp-time | 470-2 | 470-2 | 470-2 | 470-2 | 470-2 | 410-8 | 410-8 |
| DOL (microns) | 33 | 35 | 36 | 39 | 42 | 36 | 40 |
| CS (MPa) | 619 | 577 | 580 | 569 | 506 | 631 | 614 |
| Knoop Scratch (N) | 6 | 8 | 10 | 16 | 18 | 20 | 18 |
| Vicker indent threshold | 10-15 Kg | 10-15 Kg | 10-15 Kg | 10-15 Kg | 10-15 Kg | | |

TABLE 3-continued

| | | | | | | | |
|---|---|---|---|---|---|---|---|
| T200p | 1749 | | | | | | |
| Liq viscosity poise | >1e6 | | | | | | |

| | 8 | 9 | 10 | 11 | 12 | 13 | 14 |
|---|---|---|---|---|---|---|---|
| $SiO_2$ | 73.0 | 71.8 | 71.8 | 71.8 | 70.1 | 72.7 | 70.1 |
| $Al_2O_3$ | 9.7 | 9.7 | 9.2 | 9.2 | 10.0 | 8.3 | 10.0 |
| $B_2O_3$ | 5.3 | 5.5 | 5.5 | 5.5 | 8.3 | 9.0 | 6.3 |
| $ZrO_2$ | 0.0 | 0.0 | 0.0 | 0.0 | 0.0 | 0.0 | 2.0 |
| $P_2O_5$ | 0.0 | 0.0 | 0.0 | 0.0 | 0.0 | 0.0 | 0.0 |
| $Li_2O$ | 0.0 | 0.0 | 0.0 | 0.0 | 0.0 | 0.0 | 0.0 |
| $Na_2O$ | 9.0 | 9.0 | 10.0 | 9.0 | 11.2 | 9.8 | 11.2 |
| $K_2O$ | 1.7 | 1.7 | 1.7 | 2.7 | 0.2 | 0.2 | 0.2 |
| MgO | 0.0 | 0.0 | 0.0 | 0.0 | 0.0 | 0.0 | 0.0 |
| ZnO | 1.0 | 2.0 | 2.0 | 2.0 | 0.0 | 0.0 | 0.0 |
| CaO | 0.1 | 0.5 | 0.5 | 0.5 | 0.0 | 0.0 | 0.0 |
| $SnO_2$ | 0.2 | 0.2 | 0.2 | 0.2 | 0.1 | 0.0 | 0.1 |
| $R_2O-RO-Al_2O_3$ | 2.1 | 3.5 | 5.0 | 5.0 | 1.5 | 1.7 | 1.5 |
| $SiO_2 + B_2O_3 + Al_2O_3$ | 88.0 | 87.0 | 86.5 | 86.5 | 88.5 | 90.0 | 86.5 |
| $R_2O + RO/Al_2O_3 + B_2O_3 + P_2O_5$ | 0.78 | 0.87 | 0.96 | 0.96 | 0.63 | 0.58 | 0.70 |
| strain | 551 | 544 | 541 | 539 | 526 | 519 | 532 |
| anneal | 607 | 599 | 592 | 590 | 578 | 571 | 584 |
| Softening | 905 | 899 | 859 | 853 | 827 | 816 | 862 |
| CTE | 66.5 | 65.7 | 67.3 | 70.9 | 67 | 61 | |
| Density | 2.366 | 2.384 | 2.395 | 2.403 | 2.342 | 2.323 | 2.341 |
| Ion-exchange/temp-time | 410-8 | 470-2 | 470-2 | 470-2 | 470-2 | 410-8 | 470-2 |
| DOL (microns) | 44 | 39 | 35.9 | 39.9 | 29.6 | 27 | 41.9 |
| CS (MPa) | 630 | 592 | 604 | 581 | 558 | 583 | 433 |
| Knoop Scratch (N) | 18 | 18 | 18 | 18 | 24 | 18 | 18 |
| Vicker indent threshold | | | | | 10-15 Kg | 4-5 Kg | |
| T200p | | | | | 1746 | | 1763 |
| Liq viscosity poise | | | | | >1e6 | | >1e6 |

| | 15 | 16 | 17 | 18 | 19 | 20 | 21 |
|---|---|---|---|---|---|---|---|
| $SiO_2$ | 70.1 | 70.1 | 70.1 | 71 | 72 | 73 | 72 |
| $Al_2O_3$ | 10.0 | 10.0 | 10.0 | 9.7 | 9.4 | 9 | 9.8 |
| $B_2O_3$ | 4.3 | 6.3 | 8.4 | 8.1 | 7.8 | 7.5 | 6.8 |
| $ZrO_2$ | 4.0 | 2.0 | 0.0 | 0.0 | 0.0 | 0.0 | 0.0 |
| $P_2O_5$ | 0.0 | 0.0 | 0.0 | 0.0 | 0.0 | 0.0 | 0.0 |
| $Li_2O$ | 0.0 | 0.0 | 0.0 | 0.0 | 0.0 | 0.0 | 0.0 |
| $Na_2O$ | 11.2 | 9.2 | 9.2 | 8.9 | 8.6 | 8.3 | 9.2 |
| $K_2O$ | 0.2 | 2.2 | 2.2 | 2.2 | 2.1 | 2 | 2.1 |
| MgO | 0.0 | 0.0 | 0.0 | 0.0 | 0.0 | 0.0 | 0.0 |
| ZnO | 0.0 | 0.0 | 0.0 | 0.0 | 0.0 | 0.0 | 0.0 |
| CaO | 0.0 | 0.0 | 0.0 | 0.0 | 0.0 | 0.0 | 0.0 |
| $SnO_2$ | 0.1 | 0.1 | 0.1 | 0.1 | 0.1 | 0.1 | 0.1 |
| $R_2O-RO-Al_2O_3$ | 1.5 | 1.5 | 1.5 | 1.4 | 1.3 | 1.3 | 1.5 |
| $SiO_2 + B_2O_3 + Al_2O_3$ | 84.5 | 86.5 | 88.5 | 88.8 | 89.2 | 89.5 | 88.6 |
| $R_2O + RO/Al_2O_3 + B_2O_3 + P_2O_5$ | 0.80 | 0.70 | 0.63 | 0.62 | 0.62 | 0.62 | 0.68 |
| strain | 530 | 530 | 523 | 522 | 532 | 529 | 535 |
| anneal | 586 | 584 | 576 | 574 | 586 | 581 | 589 |
| Softening | 883 | 863 | 843 | 834 | 848 | 848 | 855 |
| CTE | | | 69.8 | | | | |
| Density | 2.337 | 2.341 | 2.339 | 2.342 | 2.334 | 2.335 | 2.349 |
| Ion-exchange/temp-time | 470-2 | 470-2 | 470-2 | 470-2 | 470-2 | 470-2 | 470-2 |
| DOL (microns) | 54.4 | 52.6 | 44 | 40.3 | 41.5 | 40.8 | 44.5 |
| CS (MPa) | 373 | 385 | 447 | 447 | 444 | 433 | 492 |
| Knoop Scratch (N) | 16 | 18 | 18 | 16 | 18 | 18 | 18 |
| Vicker indent threshold | | | | | | | |
| T200p | | | | | | | |
| Liq viscosity poise | | | | | | | |

| | 22 | 23 | 24 | 25 | 26 | 27 | 28 |
|---|---|---|---|---|---|---|---|
| $SiO_2$ | 72 | 72 | 73 | 73 | 72 | 73 | 71.93 |
| $Al_2O_3$ | 10 | 9 | 8.5 | 8.5 | 9 | 8.5 | 9.39 |
| $B_2O_3$ | 6.5 | 7.6 | 7.2 | 5.2 | 5.6 | 5.2 | 7.79 |
| $ZrO_2$ | 0.0 | 0.0 | 0.0 | 0.0 | 0.0 | 0.0 | 0.0 |
| $P_2O_5$ | 0.0 | 0.0 | 0.0 | 0.0 | 0.0 | 0.0 | 0.0 |
| $Li_2O$ | 0.0 | 0.0 | 0.0 | 0.0 | 0.0 | 0.0 | 0.0 |
| $Na_2O$ | 9.2 | 8.3 | 7.8 | 8.3 | 8.3 | 8.3 | 8.57 |

TABLE 3-continued

|  |  |  |  |  |  |  |  |
|---|---|---|---|---|---|---|---|
| K$_2$O | 2.2 | 2 | 1.9 | 2 | 2 | 2 | 2.1 |
| MgO | 0.0 | 1 | 1.5 | 3 | 0.0 | 0.0 | 0.0 |
| ZnO | 0.0 | 0.0 | 0.0 | 0.0 | 3 | 3 | 0.0 |
| CaO | 0.0 | 0.0 | 0.0 | 0.0 | 0.0 | 0.0 | 0.0 |
| SnO$_2$ | 0.1 | 0.2 | 0.2 | 0.2 | 0.2 | 0.2 | 0.2 |
| R$_2$O—RO—Al$_2$O$_3$ | 1.4 | 2.3 | 2.7 | 4.8 | 4.3 | 4.8 | 1.3 |
| SiO$_2$ + B$_2$O$_3$ + Al$_2$O$_3$ | 88.5 | 88.6 | 88.7 | 86.7 | 86.6 | 86.7 | 89.1 |
| R$_2$O + RO/Al$_2$O$_3$ + B$_2$O$_3$ + P$_2$O$_5$ | 0.69 | 0.68 | 0.71 | 0.97 | 0.91 | 0.97 | 0.62 |
| strain | 541 | 532 | 536 | 554 | 540 | 538 | 530 |
| anneal | 593 | 588 | 591 | 608 | 594 | 592 | 585 |
| Softening |  | 879 | 873 | 885 | 881 | 872 | 852 |
| CTE |  | 63 | 60 | 63 | 63 | 63 | 66 |
| Density | 2.353 | 2.334 | 2.334 | 2.359 | 2.396 | 2.398 | 2.338 |
| Ion-exchange/temp-time | 470-2 | 470-2 | 470-2 | 470-2 | 470-2 | 470-2 | 410-8 |
| DOL (microns) | 45 | 38.2 | 35.9 | 36.6 | 37.4 | 36.9 | 39 |
| CS (MPa) | 503 | 507 | 477 | 555 | 547 | 545 | 587 |
| Knoop Scratch (N) | 16 | 16 | 18 | 16 | 22 | 20 | 16 |
| Vicker indent threshold |  |  |  |  |  |  |  |
| T200p Liq viscosity poise |  |  |  |  |  |  |  |

|  | 29 | 30 | 31 | 32 | 33 | 34 | 35 |
|---|---|---|---|---|---|---|---|
| SiO$_2$ | 74 | 70.7 | 73 | 70.8 | 73.1 | 73.1 | 73 |
| Al$_2$O$_3$ | 8.7 | 11 | 8 | 9.2 | 9.5 | 9.5 | 9.5 |
| B$_2$O$_3$ | 7.2 | 7.7 | 7.9 | 9.3 | 6.3 | 7.9 | 7.9 |
| ZrO$_2$ | 0.0 | 0.0 | 0.0 | 0.0 | 0.0 | 0.0 | 0.0 |
| P$_2$O$_5$ | 0.0 | 0.0 | 0.0 | 0.0 | 0.0 | 0.0 | 0.0 |
| Li$_2$O | 0.0 | 0.0 | 0.0 | 0.0 | 0.0 | 0.0 | 0.0 |
| Na$_2$O | 8 | 8.4 | 8.7 | 8.4 | 8.7 | 7.1 | 8.7 |
| K$_2$O | 1.9 | 2.1 | 2.1 | 2.1 | 2.1 | 2.1 | 0.6 |
| MgO | 0.0 | 0.0 | 0.0 | 0.0 | 0.0 | 0.0 | 0.0 |
| ZnO | 0.0 | 0.0 | 0.0 | 0.0 | 0.0 | 0.0 | 0.0 |
| CaO | 0.0 | 0.0 | 0.0 | 0.0 | 0.0 | 0.0 | 0.0 |
| SnO$_2$ | 0.2 | 0.2 | 0.2 | 0.2 | 0.2 | 0.2 | 0.2 |
| R$_2$O—RO—Al$_2$O$_3$ | 1.2 | −0.5 | 0.2 | 0.2 | 1.3 | −0.3 | −0.2 |
| SiO$_2$ + B$_2$O$_3$ + Al$_2$O$_3$ | 89.9 | 89.4 | 88.9 | 89.3 | 88.9 | 90.5 | 90.4 |
| R$_2$O + RO/Al$_2$O$_3$ + B$_2$O$_3$ + P$_2$O$_5$ | 0.62 | 0.56 | 0.68 | 0.57 | 0.68 | 0.53 | 0.53 |
| strain | 533 | 553 | 525 | 514 | 543 | 550 | 555 |
| anneal | 590 | 620 | 575 | 567 | 598 | 621 | 621 |
| Softening | 874 | 964 | 810 | 837 | 869 | 987 | 968 |
| CTE | 62.3 | 64.8 | 65.1 | 65.3 | 66.6 | 59.8 | 59.9 |
| Density | 2.328 | 2.329 | 2.352 | 2.325 | 2.349 | 2.307 | 2.307 |
| Ion-exchange/temp-time | 410-8 | 410-8 | 410-8 | 410-8 | 410-8 | 410-8 | 410-8 |
| DOL (microns) | 39 | 46 | 32 | 37 | 41 | 45 | 37 |
| CS (MPa) | 545 | 590 | 559 | 531 | 614 | 503 | 596 |
| Knoop Scratch (N) | 20 | 20 | 18 | 18 | 20 | 18 | 18 |
| Vicker indent threshold |  |  |  |  |  |  |  |
| T200p Liq viscosity poise |  |  |  |  |  |  |  |

|  | 36 | 37 | 38 | 39 | 40 | 41 | 42 |
|---|---|---|---|---|---|---|---|
| SiO$_2$ | 71.9 | 71.93 | 71.9 | 71.9 | 71.9 | 71.93 | 71.9 |
| Al$_2$O$_3$ | 9.1 | 9.39 | 8.9 | 8.9 | 8.9 | 7.89 | 10.3 |
| B$_2$O$_3$ | 7.5 | 7.79 | 7.4 | 7.4 | 7.4 | 7.79 | 5.8 |
| ZrO$_2$ | 0.0 | 0.0 | 0.0 | 0.0 | 0.0 | 1.5 | 0.0 |
| P$_2$O$_5$ | 0.0 | 0.0 | 0.0 | 0.0 | 0.0 | 0.0 | 0.0 |
| Li$_2$O | 1 | 1 | 0.0 | 0.0 | 0.0 | 0.0 | 0.0 |
| Na$_2$O | 8.3 | 7.57 | 8.1 | 8.1 | 8.1 | 8.57 | 9.8 |
| K$_2$O | 2 | 2.1 | 2 | 2 | 2 | 2.1 | 2 |
| MgO | 0.0 | 0.0 | 1.5 | 0.0 | 0.0 | 0.0 | 0.0 |
| ZnO | 0.0 | 0.0 | 0.0 | 1.5 | 0.0 | 0.0 | 0.0 |
| CaO | 0.0 | 0.0 | 0.0 | 0.0 | 1.5 | 0.0 | 0.0 |
| SnO$_2$ | 0.2 | 0.2 | 0.2 | 0.2 | 0.2 | 0.2 | 0.2 |
| R$_2$O—RO—Al$_2$O$_3$ | 2.2 | 1.3 | 2.7 | 2.7 | 2.7 | 2.8 | 1.5 |
| SiO$_2$ + B$_2$O$_3$ + Al$_2$O$_3$ | 88.5 | 89.1 | 88.2 | 88.2 | 88.2 | 87.6 | 88.0 |
| R$_2$O + RO/Al$_2$O$_3$ + B$_2$O$_3$ + P$_2$O$_5$ | 0.68 | 0.62 | 0.71 | 0.71 | 0.71 | 0.68 | 0.73 |
| strain | 509 | 508 | 535 | 525 | 520 | 536 | 549 |
| anneal | 557 | 559 | 589 | 579 | 576 | 590 | 603 |

TABLE 3-continued

| | | | | | | | |
|---|---|---|---|---|---|---|---|
| Softening | 798 | 824 | 871 | 861 | 873 | 848 | 870 |
| CTE | 66 | 63.7 | 62.9 | 63.6 | 62.8 | 65 | 70.1 |
| Density | 2.352 | 2.334 | 2.34 | 2.36 | 2.322 | 2.377 | 2.363 |
| Ion-exchange/temp-time | 410-8 | 410-8 | 470-2 | 470-2 | 470-2 | 470-2 | 470-2 |
| DOL (microns) | 30 | 33 | 35.6 | 36.1 | 43.2 | 34.5 | 43.4 |
| CS (MPa) | 595 | 571 | 510 | 482 | 399 | 545 | 625 |
| Knoop Scratch (N) | 26 | 18 | 16 | 16 | 18 | 20 | 16 |
| Vicker indent threshold | | | | | | | |
| T200p | | | | 1796 | | 1733 | |
| Liq viscosity poise | | | | >1e6 | | >2e5 | |

| | 43 | 44 |
|---|---|---|
| $SiO_2$ | 70 | 69.9 |
| $Al_2O_3$ | 9 | 10.4 |
| $B_2O_3$ | 8.4 | 5 |
| $ZrO_2$ | 0.0 | 0.0 |
| $P_2O_5$ | 0.0 | 3 |
| $Li_2O$ | 0.0 | 0.0 |
| $Na_2O$ | 9.2 | 10.9 |
| $K_2O$ | 2.2 | 0.0 |
| MgO | 1 | 0.8 |
| ZnO | 0.0 | 0.0 |
| CaO | 0.0 | 0.0 |
| $SnO_2$ | 0.2 | 0.1 |
| $R_2O$—RO—$Al_2O_3$ | 3.4 | 1.3 |
| $SiO_2 + B_2O_{3+} Al_2O_3$ | 87.4 | 85.3 |
| $R_2O + RO/Al_2O_{3+} B_2O_{3+} P_2O_5$ | 0.71 | 0.64 |
| strain | 523 | |
| anneal | 571 | |
| Softening | 805 | |
| CTE | 68.5 | |
| Density | 2.359 | |
| Ion-exchange/temp-time | 470-2 | 470-2 |
| DOL (microns) | 35.2 | 49 |
| CS (MPa) | 503 | 476 |
| Knoop Scratch (N) | 14 | 18 |
| Vicker indent threshold | 10-15 Kg | |
| T200p | | |
| Liq viscosity poise | | |

With reference to Table 3, the glasses described therein were melted in Platinum crucibles at temperatures above about 1500° C., quenched and then annealed. Glass sheets having dimensions of about 25×25×1 mm or about 50×50×1 mm were made and then ion-exchanged using a $KNO_3$ molten salt bath at temperatures varying from about 410° C. to about 470° C. and at times varying between 2 hours and 8 hours. Scratch resistance was evaluated using a Knoop diamond indenter. The scratch threshold was determined by identifying the load range for lateral crack onset, and then generating a series of increasing constant load 5 mm long scratches (3 or more per load) at a speed of 4 mm/s to identify the Knoop scratch threshold (KST). Lateral cracks can be defined as sustained cracks greater than twice the width of the groove.

Figure 7:
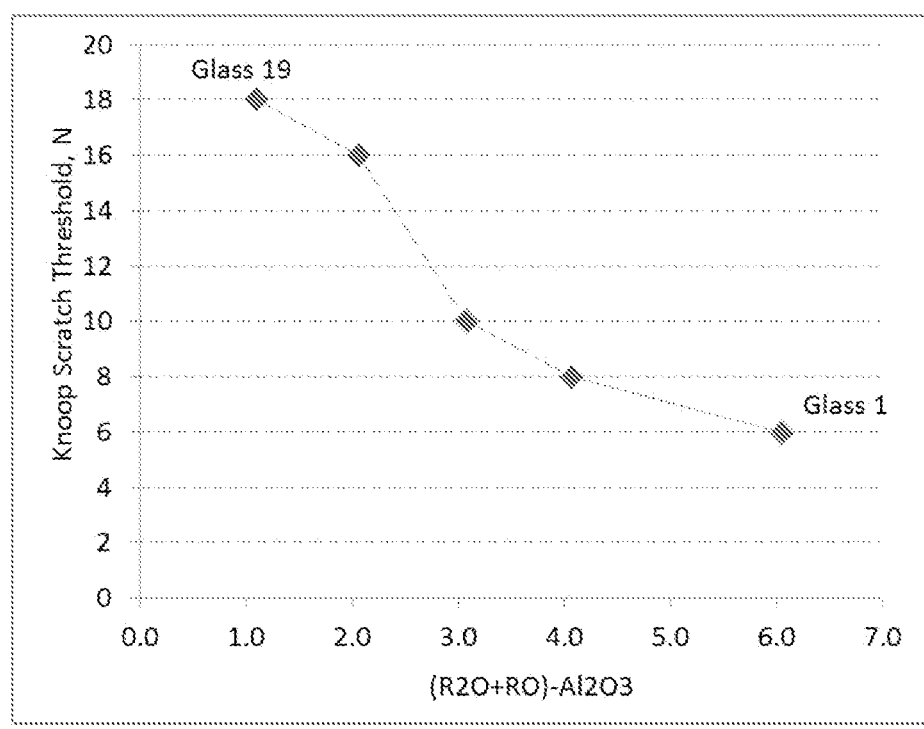
FIG. 7 is a plot of Knoop Scratch Threshold (KST) as a function of excess alkali and alkaline earth modifiers for some embodiments.

FIG. 7 is a plot of KST as a function of excess alkali and alkaline earth modifiers for some embodiments. As illustrated in FIG. 7 and with reference to Table 3, KST increases as excess alkali and alkaline earth modifiers (e.g., $R_2O$, RO) decrease and the glasses approach charge balance. It can be observed that the trajectory follows a walk between Glass 1 and Glass 19, where KST increases with the transition from Glass 1 (highly modified) to Glass 19 (near charge balance).

Figure 8:
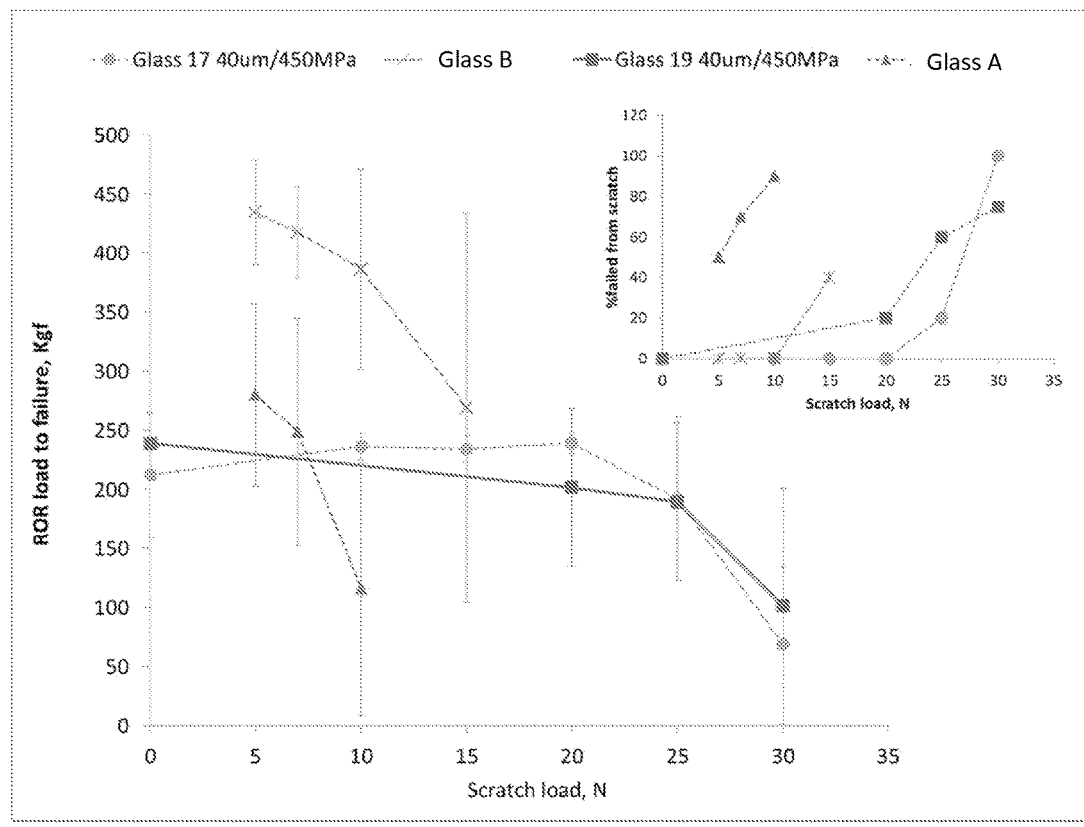
FIG. 8 is a plot of ring on ring load to failure versus scratch load for some embodiments.

FIG. 8 is a plot of ring on ring load to failure versus scratch load for some embodiments. Scratches were imposed on the glasses using a Knoop indenter at different loads and then tested using ring-on-ring (ROR) as a way to measure retained strength after damage by scratch. Annealed Glass 17 and Glass 19 were ion-exchanged in a $KNO_3$ salt bath at 470° C. for 2 h. Glasses A (2318) and B (4318) were ion-exchanged using standard conditions and are used for comparison. As illustrated in FIG. 8, ROR load to failure can be observed as a function of scratch load. For example, Glass 17 and Glass 19 show considerably higher tolerance to scratches when compared to Glasses A and B, retaining higher than 80% of their strength even when scratched at loads as high as 25N. The insert of FIG. 8 illustrates the percentage of parts having the scratch as the failure source.

Figure 9:
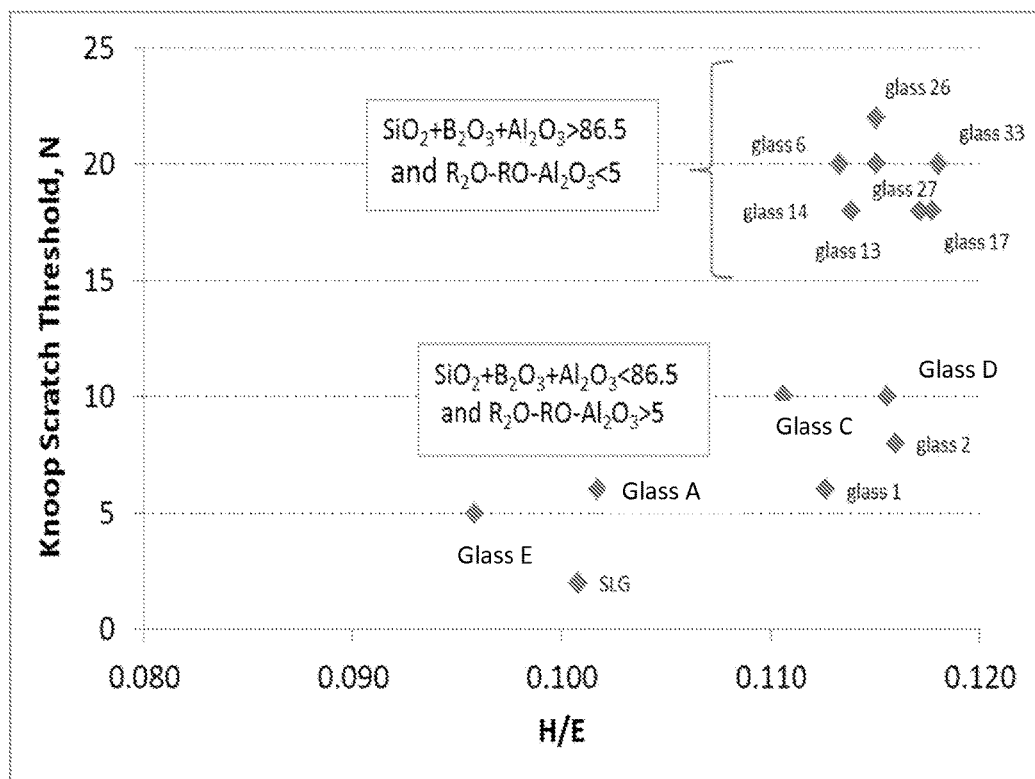
FIG. 9 is a plot of KST as a function of hardness to modulus ratio (H/E).

FIG. 9 is a plot of KST as a function of hardness to modulus ratio (H/E). Nanoindentation using a Vickers indenter was used for measuring modulus and hardness of different glasses identified in FIG. 9 and Table 3. With reference to FIG. 9 and Table 3, it can be observed that an increase in KST correlates with an increasing H/E. Further, it can be observed that exemplary embodiments having $SiO_2+B_2O_3+Al_2O_3$≥about 86.5 mol. %. or ≤about 88 mol. % and/or $R_2O$—RO—$Al_2O_3$<about 5 mol. % or <about 3 mol. % exhibit a higher KST and superior H/E than Glasses A, C (3318), D (2320), and E (2317).

Again, $SiO_2$ can serve as a viscosity enhancer to aid formability and impart chemical durability to the glass and can raise the melting temperature; however, the alkali metal oxides content of the exemplary glass compositions can facilitate melting, soften the glass, enable ion exchange, decrease melt resistivity, and can break up the glass network which increases thermal expansion and decreases durability. In exemplary embodiments, $B_2O_3$ can be used as a flux to soften glasses, making them easier to melt and easier to form. $B_2O_3$ can also be used to scavenge non-bridging oxygen atoms (NBOs) to thereby convert the NBOs to bridging oxygen atoms through the formation of a $BO_4$ tetrahedra as discussed above, and to lower the hardness of the glass which, when coupled with the higher toughness, decreases the brittleness, thereby resulting in a mechanically durable glass.

In some embodiments, the chemically-strengthened as well as the non-chemically-strengthened glass can also be batched with 0-2 mol. % of at least one fining agent selected from a group that includes $Na_2SO_4$, NaCl, NaF, NaBr, $K_2SO_4$, KCl, KF, KBr, and $SnO_2$.

In one exemplary embodiment, sodium ions in the chemically-strengthened glass can be replaced by potassium ions from the molten bath, though other alkali metal ions having a larger atomic radii, such as rubidium or cesium, can replace smaller alkali metal ions in the glass. According to particular embodiments, smaller alkali metal ions in the glass can be replaced by $Ag^-$ ions. Similarly, other alkali metal salts such as, but not limited to, sulfates, halides, and the like may be used in the ion exchange process.

The replacement of smaller ions by larger ions at a temperature below that at which the glass network can relax produces a distribution of ions across the surface of the glass that results in a stress profile. The larger volume of the incoming ion produces a compressive stress (CS) on the surface and tension (central tension, or CT) in the center of the glass. The compressive stress can be related to the central tension by the following simplified approximation:

$$CS = CT\left(\frac{t - 2DOL}{DOL}\right)$$

where t is the total thickness of the glass sheet and DOL is the depth of exchange, also referred to as depth of layer.

According to various embodiments, hybrid glass laminate structures comprising ion-exchanged glass possess an array of desired properties, including low weight, high impact resistance, and improved sound attenuation.

In one embodiment, a chemically-strengthened glass sheet can have a surface compressive stress of at least 300 MPa, e.g., at least 400, 450, 500, 550, 600, 650, 700, 750 or 800 MPa, a depth of layer at least about 20 µm (e.g., at least about 20, 25, 30, 35, 40, 45, or 50 µm) and/or a central tension greater than 40 MPa (e.g., greater than 40, 45, or 50 MPa) but less than 100 MPa (e.g., less than 100, 95, 90, 85, 80, 75, 70, 65, 60, or 55 MPa).

A modulus of elasticity of a chemically-strengthened glass sheet can range from about 60 GPa to 85 GPa (e.g., 60, 65, 70, 75, 80 or 85 GPa). The modulus of elasticity of the glass sheet(s) and the polymer interlayer can affect both the mechanical properties (e.g., deflection and strength) and the acoustic performance (e.g., transmission loss) of the resulting glass laminate structure.

Methods

Exemplary glass sheet forming methods include fusion draw and slot draw processes, which are each examples of a down-draw process, as well as float processes. These methods can be used to form both chemically-strengthened and non-chemically-strengthened glass sheets. The fusion draw process uses a drawing tank that has a channel for accepting molten glass raw material. The channel has weirs that are open at the top along the length of the channel on both sides of the channel. When the channel fills with molten material, the molten glass overflows the weirs. Due to gravity, the molten glass flows down the outside surfaces of the drawing tank. These outside surfaces extend down and inwardly so that they join at an edge below the drawing tank. The two flowing glass surfaces join at this edge to fuse and form a single flowing sheet. The fusion draw method offers the advantage that, because the two glass films flowing over the channel fuse together, neither outside surface of the resulting glass sheet comes in contact with any part of the apparatus. Thus, the surface properties of the fusion drawn glass sheet are not affected by such contact.

Thus, exemplary glass layers can be made by fusion drawing, as generally described above and described in U.S. Pat. Nos. 7,666,511, 4,483,700 and 5,674,790, the entirety of each being incorporated herein by reference, and then chemically strengthening such drawn glass. Exemplary chemically strengthened glass layers can thus possess a deep DOL of CS and can present a high flexural strength, scratch resistance and impact resistance. Exemplary embodiments can also include acid etched surfaces to increase the impact resistance and increasing the strength of such surfaces by reducing the size and severity of flaws on these surfaces. If etched immediately prior to lamination, the strengthening benefit of etching or flaring can be maintained on surfaces bonded to the inter-layer. As noted above, exemplary embodiments can include a glass-glass laminate structure. Such structures and methods for forming structures are described in co-owned U.S. Pat. No. 8,007,913, U.S. Pub. No. 2013/0015180, U.S. Pub. No. 2013/0312459, and WO14/018838, the entirety of each being incorporated herein by reference.

The slot draw method is distinct from the fusion draw method. Here the molten raw material glass is provided to a drawing tank. The bottom of the drawing tank has an open slot with a nozzle that extends the length of the slot. The molten glass flows through the slot/nozzle and is drawn downward as a continuous sheet and into an annealing region. The slot draw process can provide a thinner sheet than the fusion draw process because only a single sheet is drawn through the slot, rather than two sheets being fused together.

Down-draw processes produce glass sheets having a uniform thickness that possess surfaces that are relatively pristine. Because the strength of the glass surface is controlled by the amount and size of surface flaws, a pristine surface that has had minimal contact has a higher initial strength. When this high strength glass is then chemically strengthened, the resultant strength can be higher than that of a surface that has been a lapped and polished. Down-drawn glass may be drawn to a thickness of less than about 2 mm. In addition, down drawn glass has a very flat, smooth surface that can be used in its final application without costly grinding and polishing.

In the float glass method, a sheet of glass that may be characterized by smooth surfaces and uniform thickness is made by floating molten glass on a bed of molten metal, typically tin. In an exemplary process, molten glass that is fed onto the surface of the molten tin bed forms a floating ribbon. As the glass ribbon flows along the tin bath, the temperature is gradually decreased until a solid glass sheet can be lifted from the tin onto rollers. Once off the bath, the glass sheet can be cooled further and annealed to reduce internal stress.

Some embodiments provide a glass laminate structure comprising an external glass sheet and an internal glass sheet where one or both of the glass sheets comprises $SiO_2+B_2O_3+Al_2O_3 \geq 86.5$ mol. %. and $R_2O-RO-Al_2O_3 <$ about 5 mol. %. In other embodiments, one or both of the glass sheets comprises $SiO_2+B_2O_3+Al_2O_3 \geq$ about 88 mol. %. In further embodiments, one or both of the glass sheets comprises $R_2O-RO-Al_2O_3 <$ about 3 mol. %. Some non-limiting embodiments can include an external glass sheet being a chemically strengthened glass sheet which comprises $SiO_2+B_2O_3+Al_2O_3 \geq 86.5$ mol. %. and $R_2O-RO-Al_2O_3 <$ about 5 mol. %, and where the internal glass sheet comprises a material selected from the group consisting of soda-lime glass and annealed glass. Other embodiments can include an internal glass sheet being a chemically strengthened glass sheet which comprises $SiO_2+B_2O_3+Al_2O_3 \geq 86.5$ mol. %. and $R_2O-RO-Al_2O_3 <$ about 5 mol. %, and where the external glass sheet comprises a material selected from the group consisting of soda-lime glass and annealed glass. In additional embodiments, one or both of the glass sheets further comprises between about 69-80 mol. % $SiO_2$, between about 6-12 mol. % $Al_2O_3$, between about 2-10 mol. % $B_2O_3$, between about 0-5 mol. % $ZrO_2$, $Li_2O$, MgO, ZnO and $P_2O_5$, between about 6-15 mol. % $Na_2O$, between about 0-3 mol. % $K_2O$ and CaO, and between about 0-2 mol. % $SnO_2$. In some embodiments, one or both of the glass sheets further comprises between about 72-80 mol. % $SiO_2$, between about 8-12 mol. % $Al_2O_3$, between about 4-10 mol. % $B_2O_3$, between about 0-4 mol. % $ZrO_2$, MgO, and ZnO, between about 0-2 mol. % $Li_2O$, CaO, and $P_2O_5$, between about 7-14 mol. % $Na_2O$, between about 0.1-2.5 mol. % $K_2O$, and between about 0.1-1.5 mol. % $SnO_2$. In yet further embodiments, one or both of the glass sheets further comprises between about 74-80 mol. % $SiO_2$, between about 8-11 mol. % $Al_2O_3$, between about 4-9 mol. % $B_2O_3$, between about 0-2 mol. % $ZrO_2$, between about 0-3 mol. % MgO and ZnO, between about 0-1 mol. % $Li_2O$ and $P_2O_5$, between about 7-12 mol. % $Na_2O$, between about 0.1-2.2 mol. % $K_2O$, between about 0-1.5 mol. % CaO, and between about 0.1-0.5 mol. % $SnO_2$. In some embodiments, $(R_2O+RO)/(P_2O_5+B_2O_3+Al_2O_3)$ can be between about 0.5-1.2, between about 0.6-0.9, or between about 0.65-0.85. In additional embodiments, one or both of the glass sheets can be ion-exchanged to a compressive stress of at least about 300 MPa and a depth of layer of compressive stress of at least about 15 microns with a Knoop Scratch Threshold > about 12N or >about 16N and a hardness to modulus ratio >about 0.112 or >about 0.116. Exemplary thicknesses for the internal glass sheet can range from about 0.3 mm to about 1.5 mm and exemplary thicknesses for the external glass sheet can range from about 1.5 mm to about 3.0 mm, or vice-versa. In further embodiments, the structure can include a polymer interlayer intermediate the external and internal glass sheets, where the polymer interlayer comprises a single polymer sheet, a multilayer polymer sheet, or a composite polymer sheet. Such suitable laminate structures can be employed in, for example, an automotive side-window, automotive sunroof, automotive windshield, architectural window, and a display, just to name a few.

Additional embodiments can include a glass sheet comprising $SiO_2+B_2O_3+Al_2O_3 \geq 86.5$ mol. %. and $R_2O-RO-Al_2O_3 <$ about 5 mol. %. Some embodiments can further comprise $SiO_2+B_2O_3+Al_2O_3 \geq$ about 88 mol. % and/or $R_2O-RO-Al_2O_3 <$ about 3 mol. %. In additional embodiments, the glass sheet further comprises between about 69-80 mol. % $SiO_2$, between about 6-12 mol. % $Al_2O_3$, between about 2-10 mol. % $B_2O_3$, between about 0-5 mol. % $ZrO_2$, $Li_2O$, MgO, ZnO and $P_2O_5$, between about 6-15 mol. % $Na_2O$, between about 0-3 mol. % $K_2O$ and CaO, and between about 0-2 mol. % $SnO_2$. In some embodiments, the glass sheet further comprises between about 72-80 mol. % $SiO_2$, between about 8-12 mol. % $Al_2O_3$, between about 4-10 mol. % $B_2O_3$, between about 0-4 mol. % $ZrO_2$, MgO, and ZnO, between about 0-2 mol. % $Li_2O$, CaO, and $P_2O_5$, between about 7-14 mol. % $Na_2O$, between about 0.1-2.5 mol. % $K_2O$, and between about 0.1-1.5 mol. % $SnO_2$. In yet further embodiments, the glass sheet further comprises between about 74-80 mol. % $SiO_2$, between about 8-11 mol. % $Al_2O_3$, between about 4-9 mol. % $B_2O_3$, between about 0-2 mol. % $ZrO_2$, between about 0-3 mol. % MgO and ZnO, between about 0-1 mol. % $Li_2O$ and $P_2O_5$, between about 7-12 mol. % $Na_2O$, between about 0.1-2.2 mol. % $K_2O$, between about 0-1.5 mol. % CaO, and between about 0.1-0.5 mol. % $SnO_2$. In some embodiments, $(R_2O+RO)/(P_2O_5+B_2O_3+Al_2O_3)$ can be between about 0.5-1.2, between about 0.6-0.9, or between about 0.65-0.85. In additional embodiments, the glass sheet can be ion-exchanged to a compressive stress of at least about 300 MPa and a depth of layer of compressive stress of at least about 15 microns with a Knoop Scratch Threshold > about 12N or >about 16N and a hardness to modulus ratio >about 0.112 or >about 0.116. Exemplary thicknesses for the glass sheet can range from about 0.3 mm to about 1.5 mm. Such suitable structures using such exemplary glass sheets include, but are not limited to, an automotive side-window, automotive sunroof, automotive windshield, architectural window, and a display, just to name a few Applicant has demonstrated that the glass structures disclosed herein have excellent durability, impact resistance, toughness, and scratch and environmental resistance. As is well known among skilled artisans, the strength and mechanical impact performance of a glass sheet or laminate can be limited by defects in the glass, including both surface and internal defects. When a glass laminate structure is impacted, the impact point is put into compression, while a ring or "hoop" around the impact point, as well as the opposite face of the impacted sheet, are put into tension. Typically, the origin of failure will be at a flaw, usually on the glass surface, at or near the point of highest tension. This may occur on the opposite face, but can occur within the ring. If a flaw in the glass is put into tension during an impact event, the flaw will likely propagate, and the glass will typically break. Thus, a high magnitude and depth of compressive stress (depth of layer) is preferable.

Due to chemical strengthening, one or both of the surfaces of the chemically-strengthened glass sheets used in the disclosed hybrid glass laminate structures are under compression. The incorporation of a compressive stress in a near surface region of the glass can inhibit crack propagation and failure of the glass sheet. In order for flaws to propagate and failure to occur, the tensile stress from an impact must exceed the surface compressive stress at the tip of the flaw. In embodiments, the high compressive stress and high depth of layer of chemically-strengthened glass sheets enable the use of thinner glass than in the case of non-chemically-strengthened glass.

In the case of hybrid glass laminate structures, the laminate structure can deflect without breaking in response to the mechanical impact much further than thicker monolithic, non-chemically-strengthened glass or thicker, non-chemically-strengthened glass laminate structures. This added deflection enables more energy transfer to the laminate interlayer, which can reduce the energy that reaches the opposite side of the glass. Consequently, the hybrid glass laminate structures disclosed herein can withstand higher impact energies than monolithic, non-chemically-strengthened glass or non-chemically-strengthened glass laminate structures of similar thickness.

In addition to their mechanical properties, as will be appreciated by a skilled artisan, laminated structures can be used to dampen acoustic waves. The hybrid glass laminate structures disclosed herein can dramatically reduce acoustic transmission while using thinner (and lighter) structures that also possess the requisite mechanical properties for many glazing applications.

The acoustic performance of laminates and glazings is commonly impacted by the flexural vibrations of the glazing structure. Without wishing to be bound by theory, human acoustic response peaks typically between 500 Hz and 5000 Hz, corresponding to wavelengths of about 0.1-1 m in air and 1-10 m in glass. For a glazing structure less than 0.01 m (<10 mm) thick, transmission occurs mainly through coupling of vibrations and acoustic waves to the flexural vibration of the glazing. Laminated glazing structures can be designed to convert energy from the glazing flexural modes into shear strains within the polymer interlayer. In glass laminate structures employing thinner glass sheets, the greater compliance of the thinner glass permits a greater vibrational amplitude, which in turn can impart greater shear strain on the interlayer. The low shear resistance of most viscoelastic polymer interlayer materials means that the interlayer will promote damping via the high shear strain that will be converted into heat under the influence of molecular chain sliding and relaxation.

In addition to the glass laminate structure thickness, the nature of the glass sheets that comprise the laminates may also influence the sound attenuating properties. For instance, as between chemically-strengthened and non-chemically-strengthened glass sheets, there may be small but significant difference at the glass-polymer interlayer interface that contributes to higher shear strain in the polymer layer. Also, in addition to their obvious compositional differences, aluminosilicate glasses and soda lime glasses have different physical and mechanical properties, including modulus, Poisson's ratio, density, etc., which may result in a different acoustic response.

Additional advantages of embodiments described herein include laminate structures or glass sheets having enhanced contact damage performance due to higher CS and/or inherent damage resistance, improved impact resistance over existing laminate structures, improved optics over float glass, improved theft security, due to the higher breakage resistance and improved chemical durability, particularly to acid rain. Further advantages of embodiments described herein include laminate structures or glass sheets that can reduce vehicular weight, improve fuel efficiency, lower $CO_2$ emissions, and improve vehicle handling. Such structures can also provide potentially larger windows, due to the weight reduction as well as provide potential manufacturing yield improvement through elimination of a heat strengthening step. Versus thick monolithic glass, embodiments can also include the aforementioned advantages and also provide an improved acoustic performance due to multilayer construction, a lower heat load, depending on the choice of interlayer material, and further yield improvement through elimination of thermal tempering step.

While this description may include many specifics, these should not be construed as limitations on the scope thereof, but rather as descriptions of features that may be specific to particular embodiments. Certain features that have been heretofore described in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and may even be initially claimed as such, one or more features from a claimed combination may in some cases be excised from the combination, and the claimed combination may be directed to a subcombination or variation of a subcombination.

Similarly, while operations are depicted in the drawings or figures in a particular order, this should not be understood as requiring that such operations be performed in the particular order shown or in sequential order, or that all illustrated operations be performed, to achieve desirable results. In certain circumstances, multitasking and parallel processing may be advantageous Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

It is also noted that recitations herein refer to a component of the present disclosure being "configured" or "adapted to" function in a particular way. In this respect, such a component is "configured" or "adapted to" embody a particular property, or function in a particular manner, where such recitations are structural recitations as opposed to recitations of intended use. More specifically, the references herein to the manner in which a component is "configured" or "adapted to" denotes an existing physical condition of the component and, as such, is to be taken as a definite recitation of the structural characteristics of the component.

As shown by the various configurations and embodiments illustrated in the figures, various glass laminate structures and compositions therefor have been described.

While preferred embodiments of the present disclosure have been described, it is to be understood that the embodiments described are illustrative only and that the scope of the invention is to be defined solely by the appended claims when accorded a full range of equivalence, many variations and modifications naturally occurring to those of skill in the art from a perusal hereof.

What is claimed is:

1. A glass laminate structure comprising:
an external glass sheet;
an internal glass sheet; and
wherein one or both of the glass sheets comprises $SiO_2 + B_2O_3 + Al_2O_3 \geq 86.5$ mol. %, $B_2O_3$(mol. %)$\leq Al_2O_3$(mol. %), and $R_2O-RO-Al_2O_3<$about 5 mol. %, and wherein one or both of the glass sheets is ion-exchanged to a compressive stress of at least about 300 MPa and a depth of layer of compressive stress of at least about 15 microns with a Knoop Scratch Threshold>about 12 N and a hardness to modulus ratio greater than about 0.112, or a Vickers indentation threshold in a range from about 10 to about 15 Kg.

2. The glass laminate structure of claim 1, wherein one or both of the glass sheets comprises either one or both of the following: $SiO_2+B_2O_3+Al_2O_3 \geq$ about 88 mol. %, and $R_2O-RO-Al_2O_3 <$ about 3 mol. %.

3. The glass laminate structure of claim 1, wherein either the external glass sheet or the internal glass sheet is a chemically strengthened glass sheet and comprises $SiO_2+B_2O_3+Al_2O_3 \geq 86.5$ mol. %. and $R_2O-RO-Al_2O_3 <$ about 5 mol. %, and wherein the other of the external glass sheet or the internal glass sheet comprises a material selected from the group consisting of soda-lime glass and annealed glass.

4. The glass laminate structure of claim 1, wherein one or both of the glass sheets further comprises:
between about 69-80 mol. % $SiO_2$;
between about 6-12 mol. % $Al_2O_3$;
between about 2-10 mol. % $B_2O_3$;
between about 0-5 mol. % $ZrO_2$, $Li_2O$, MgO, ZnO and $P_2O_5$;
between about 6-15 mol. % $Na_2O$;
between about 0-3 mol. % $K_2O$ and CaO; and
between about 0-2 mol. % $SnO_2$.

5. The glass laminate structure of claim 1, wherein one or both of the glass sheets further comprises:
between about 72-80 mol. % $SiO_2$;
between about 8-12 mol. % $Al_2O_3$;
between about 4-10 mol. % $B_2O_3$;
between about 0-4 mol. % $ZrO_2$, MgO, and ZnO;
between about 0-2 mol. % $Li_2O$, CaO, and $P_2O_5$;
between about 7-14 mol. % $Na_2O$;
between about 0.1-2.5 mol. % $K_2O$; and
between about 0.1-1.5 mol. % $SnO_2$.

6. The glass laminate structure of claim 1, wherein one or both of the glass sheets further comprises:
between about 74-80 mol. % $SiO_2$;
between about 8-11 mol. % $Al_2O_3$;
between about 4-9 mol. % $B_2O_3$;
between about 0-2 mol. % $ZrO_2$;
between about 0-3 mol. % MgO and ZnO;
between about 0-1 mol. % $Li_2O$ and $P_2O_5$;
between about 7-12 mol. % $Na_2O$;
between about 0.1-2.2 mol. % $K_2O$;
between about 0-1.5 mol. % CaO; and
between about 0.1-0.5 mol. % $SnO_2$.

7. The glass laminate structure of claim 1, wherein $(R_2O+RO)/(P_2O_5+B_2O_3+Al_2O_3)$ is between about 0.5-1.2, between about 0.6-0.9, or between about 0.65-0.85.

8. The glass laminate structure of claim 1 wherein one or both of the glass sheets is ion-exchanged to a compressive stress of at least about 300 MPa and a depth of layer of compressive stress of at least about 15 microns with a Knoop Scratch Threshold >about 16 N and a hardness to modulus ratio>about 0.116.

9. The glass laminate structure of claim 1, wherein the internal glass sheet has a thickness ranging from about 0.3 mm to about 1.5 mm, and wherein the external glass sheet has a thickness ranging from about 1.5 mm to about 3.0 mm.

10. The glass laminate structure of claim 1, wherein the external glass sheet has a thickness ranging from about 0.3 mm to about 1.5 mm, and wherein the internal glass sheet has a thickness ranging from about 1.5 mm to about 3.0 mm.

11. The glass laminate structure of claim 1, further comprising a polymer interlayer between the external and internal glass sheets, wherein the polymer interlayer comprises a single polymer sheet, a multilayer polymer sheet, or a composite polymer sheet.

12. The glass laminate structure of claim 1, wherein the structure is selected from the group consisting of an automotive side-window, automotive sunroof, automotive windshield, architectural window, and a display.

13. A glass sheet comprising $SiO_2+B_2O_3+Al_2O_3 \geq 86.5$ mol. %, $B_2O_3$(mol. %)$\leq Al_2O_3$(mol. %), and $R_2O-RO-Al_2O_3 <$ about 5 mol. %, wherein the glass sheet, when ion-exchanged to a compressive stress of at least about 300 MPa and a depth of layer of compressive stress of at least about 15 microns, has a Knoop Scratch Threshold >about 12 N and a hardness to modulus ratio greater than about 0.112, or a Vickers indentation threshold in a range from about 10 to about 15 Kg.

14. The glass sheet of claim 13, further comprising either one or both $SiO_2+B_2O_3+Al_2O_3 \geq$ about 88 mol. %, and $R_2O-RO-Al_2O_3 <$ about 3 mol. %.

15. The glass sheet of claim 13 further comprising:
between about 69-80 mol. % $SiO_2$;
between about 6-12 mol. % $Al_2O_3$;
between about 2-10 mol. % $B_2O_3$;
between about 0-5 mol. % $ZrO_2$, $Li_2O$, MgO, ZnO and $P_2O_5$;
between about 6-15 mol. % $Na_2O$;
between about 0-3 mol. % $K_2O$ and CaO; and
between about 0-2 mol. % $SnO_2$.

16. The glass sheet of claim 13 further comprising:
between about 72-80 mol. % $SiO_2$;
between about 8-12 mol. % $Al_2O_3$;
between about 4-10 mol. % $B_2O_3$;
between about 0-4 mol. % $ZrO_2$, MgO, and ZnO;
between about 0-2 mol. % $Li_2O$, CaO, and $P_2O_5$;
between about 7-14 mol. % $Na_2O$;
between about 0.1-2.5 mol. % $K_2O$; and
between about 0.1-1.5 mol. % $SnO_2$.

17. The glass sheet of claim 13 further comprising:
between about 74-80 mol. % $SiO_2$;
between about 8-11 mol. % $Al_2O_3$;
between about 4-9 mol. % $B_2O_3$;
between about 0-2 mol. % $ZrO_2$;
between about 0-3 mol. % MgO and ZnO;
between about 0-1 mol. % $Li_2O$ and $P_2O_5$;
between about 7-12 mol. % $Na_2O$;
between about 0.1-2.2 mol. % $K_2O$;
between about 0-1.5 mol. % CaO; and
between about 0.1-0.5 mol. % $SnO_2$.

18. The glass sheet of claim 13, wherein $(R_2O+RO)/(P_2O_5+B_2O_3+Al_2O_3)$ is between about 0.5-1.2, between about 0.6-0.9, or between about 0.65-0.85.

* * * * *